United States Patent
Aoki

(10) Patent No.: US 8,660,425 B2
(45) Date of Patent: Feb. 25, 2014

(54) OPTICAL TRANSMITTING DEVICE AND OPTICAL RECEIVING DEVICE

(75) Inventor: Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 13/100,301

(22) Filed: May 4, 2011

(65) Prior Publication Data

US 2011/0293266 A1  Dec. 1, 2011

(30) Foreign Application Priority Data

May 28, 2010 (JP) .................................. 2010-123026

(51) Int. Cl.
*H04B 17/00* (2006.01)
*H04B 10/00* (2013.01)
*H04B 10/04* (2011.01)

(52) U.S. Cl.
USPC ................. 398/25; 398/9; 398/137; 398/152; 398/162; 398/182; 398/184; 398/185

(58) Field of Classification Search
None
See application file for complete search history.

(56) References Cited

U.S. PATENT DOCUMENTS

| 2005/0111845 A1* | 5/2005 | Nelson et al. ................. 398/138 |
| 2009/0196602 A1* | 8/2009 | Saunders et al. ................ 398/26 |
| 2009/0257755 A1* | 10/2009 | Buelow ......................... 398/184 |

FOREIGN PATENT DOCUMENTS

| JP | 02-278940 A | 11/1990 |
| JP | 2004-201131 A | 7/2004 |

* cited by examiner

*Primary Examiner* — Shi K Li
*Assistant Examiner* — Merlin Brito Peguero
(74) *Attorney, Agent, or Firm* — Fujitsu Patent Center

(57) ABSTRACT

There is provided an optical transmitting device including a detector to detect a transmission rate of a transmission signal, a transmission method selector to determine a transmission method of the transmission signal, based on the transmission rate detected by the detector, a modulation signal generator circuit to generate a modulation signal from the transmission signal, based on the transmission method determined by the transmission method selector, and an optical modulator to generate a modulated optical signal from the modulation signal generated by the modulation signal generator circuit.

7 Claims, 16 Drawing Sheets

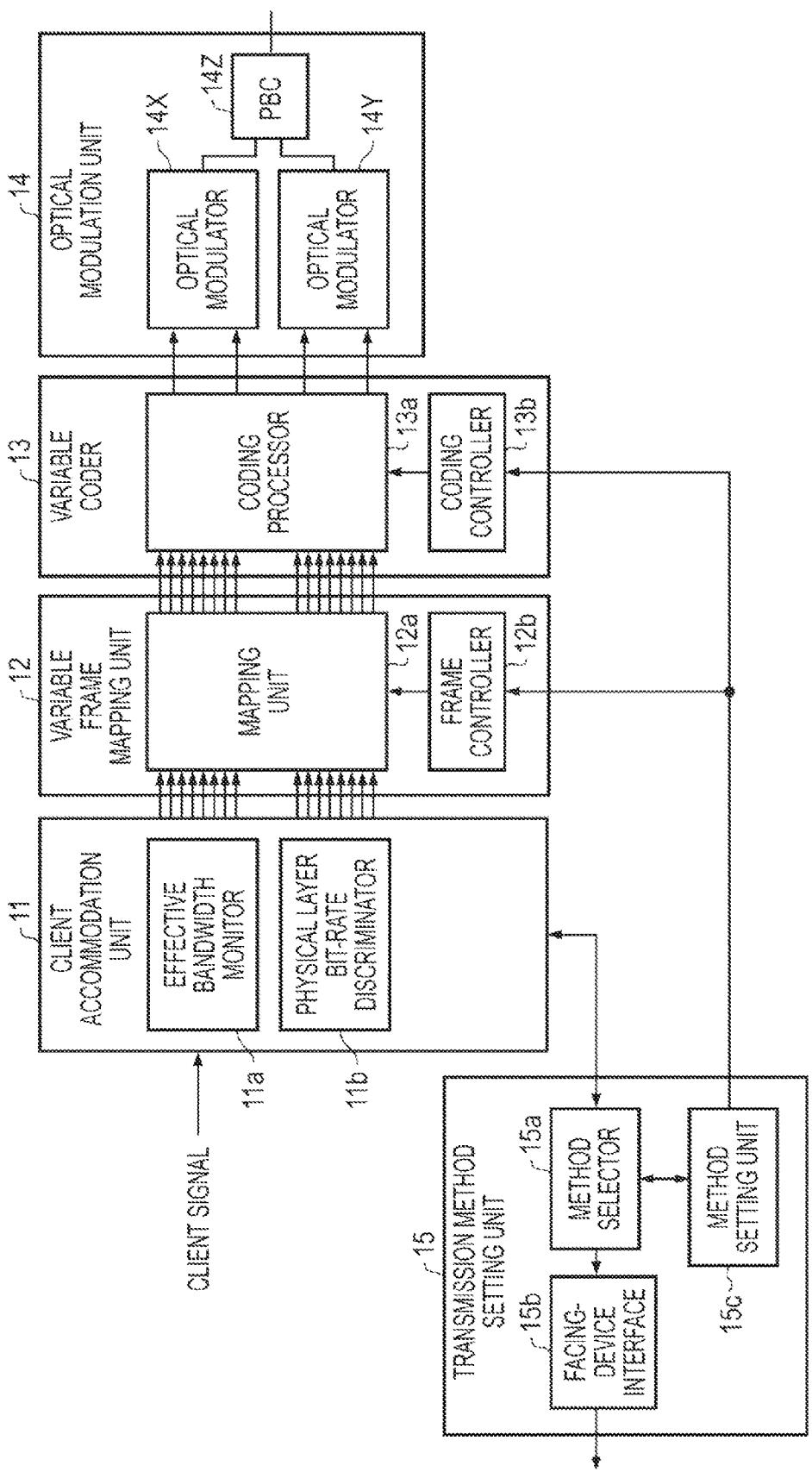

FIG. 4

| TRANSMISSION METHOD | BITS/SYMBOL | CLIENT ACCOMMODATION RATE | TRANSMISSION RATE | TRANSMISSION FRAME (TRANSMISSION LANE) |
|---|---|---|---|---|
| SP-BPSK | 1 | 6.25 | 6.70 | X1 |
| SP-QPSK | 2 | 12.50 | 13.39 | X1 TO X2 |
| SP-8PSK | 3 | 18.75 | 20.09 | X1 TO X3 |
| SP-16PSK (QAM) | 4 | 25.00 | 26.79 | X1 TO X4 |
| SP-32PSK (QAM) | 5 | 31.25 | 33.48 | X1 TO X5 |
| SP-64PSK (QAM) | 6 | 37.50 | 40.18 | X1 TO X6 |
| SP-128PSK (QAM) | 7 | 43.75 | 46.88 | X1 TO X7 |
| SP-256PSK (QAM) | 8 | 50.00 | 53.57 | X1 TO X8 |
| DP-BPSK | 2 | 12.50 | 13.39 | X1, Y1 |
| DP-QPSK | 4 | 25.00 | 26.79 | X1 TO X2, Y1 TO Y2 |
| DP-8PSK | 6 | 37.50 | 40.18 | X1 TO X3, Y1 TO Y3 |
| DP-16PSK (QAM) | 8 | 50.00 | 53.57 | X1 TO X4, Y1 TO Y4 |
| DP-32PSK (QAM) | 10 | 62.50 | 66.96 | X1 TO X5, Y1 TO Y5 |
| DP-64PSK (QAM) | 12 | 75.00 | 80.36 | X1 TO X6, Y1 TO Y6 |
| DP-128PSK (QAM) | 14 | 87.50 | 93.75 | X1 TO X7, Y1 TO Y7 |
| DP-256PSK (QAM) | 16 | 100.00 | 107.14 | X1 TO X8, Y1 TO Y8 |

FIG. 9

POLICY 1 (POWER CONSUMPTION)

HIGH PRIORITY ←→ LOW PRIORITY

| | SINGLE POLARIZATION (SP) (Bit/Symbol) | DUAL POLARIZATION (DP) (Bit/Symbol) | SINGLE POLARIZATION (SP) CLIENT ACCOMODATION RATE | DUAL POLARIZATION (DP) CLIENT ACCOMODATION RATE |
|---|---|---|---|---|
| BPSK | 1 | 2 | 6.25 | 12.50 |
| QPSK | 2 | 4 | 12.50 | 25.00 |
| 8PSK | 3 | 6 | 18.75 | 37.50 |
| 16PSK (QAM) | 4 | 8 | 25.00 | 50.00 |
| 32PSK (QAM) | 5 | 10 | 31.25 | 62.50 |
| 64PSK (QAM) | 6 | 12 | 37.50 | 75.00 |
| 128PSK (QAM) | 7 | 14 | 43.75 | 87.50 |
| 256PSK (QAM) | 8 | 16 | 50.00 | 100.00 |

HIGH PRIORITY ←→ LOW PRIORITY

POLICY 2 (MULTILEVEL MODULATION FACTOR)

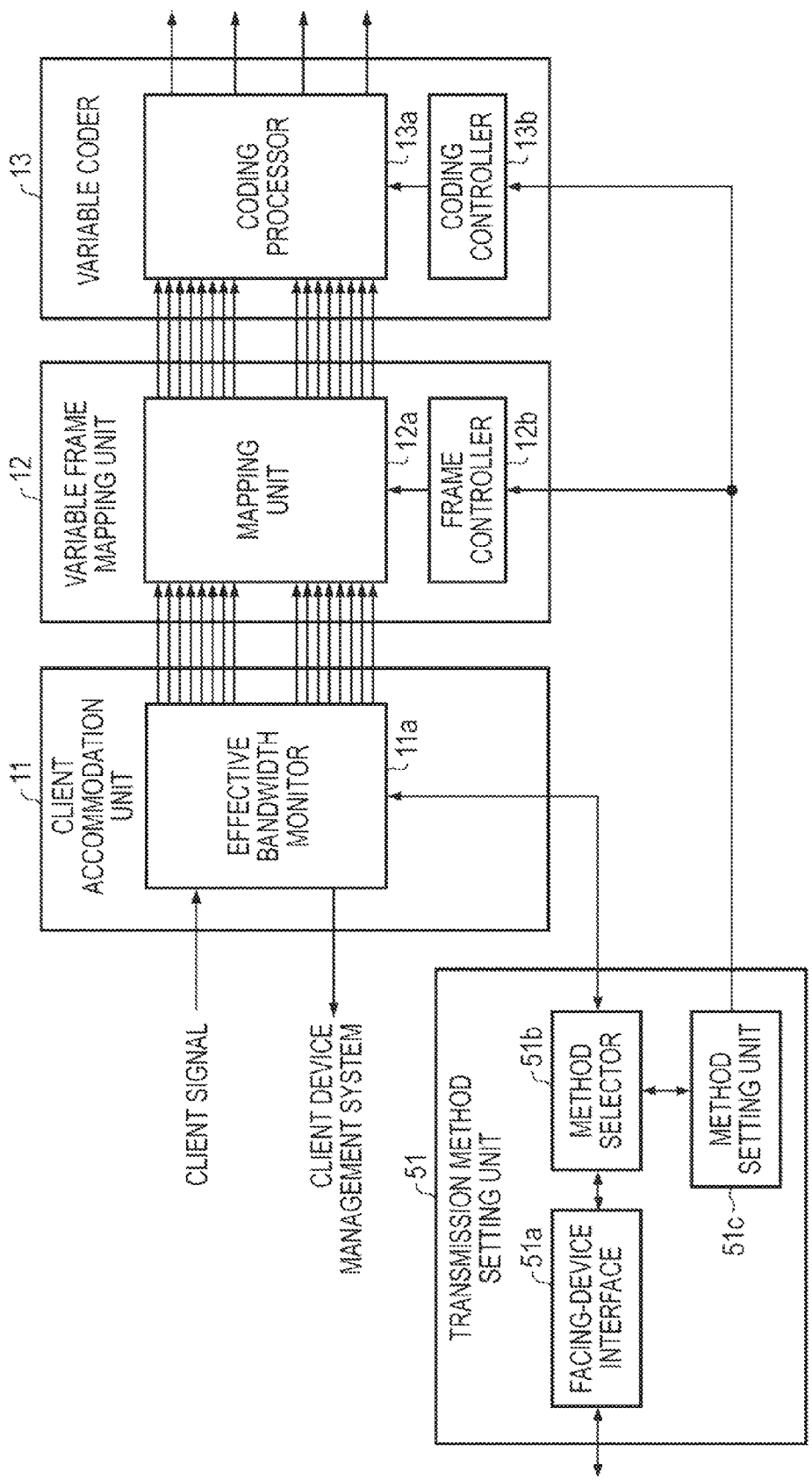

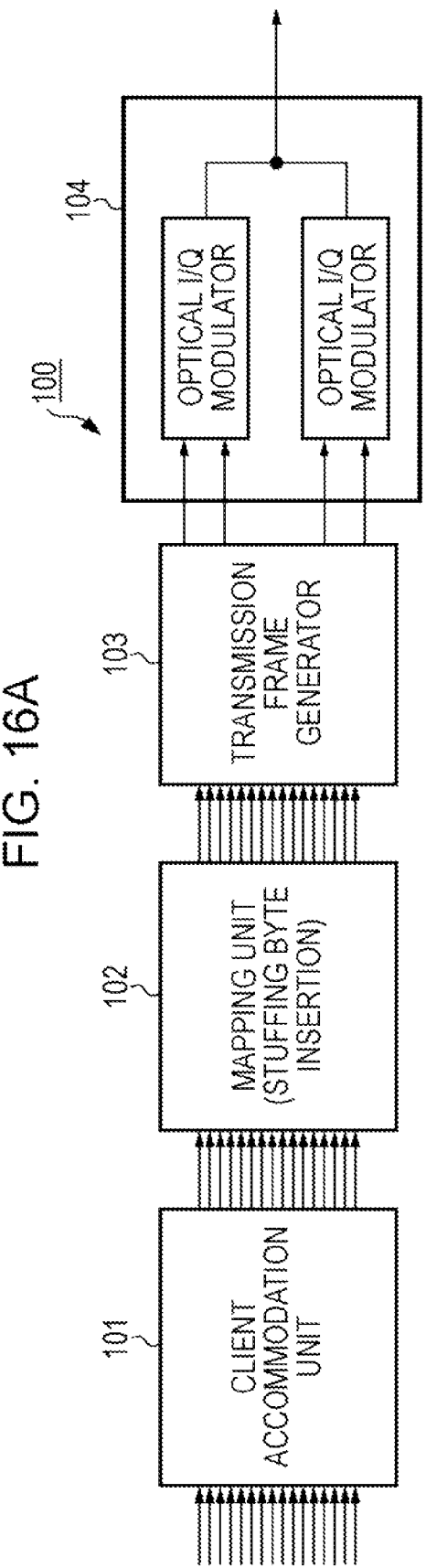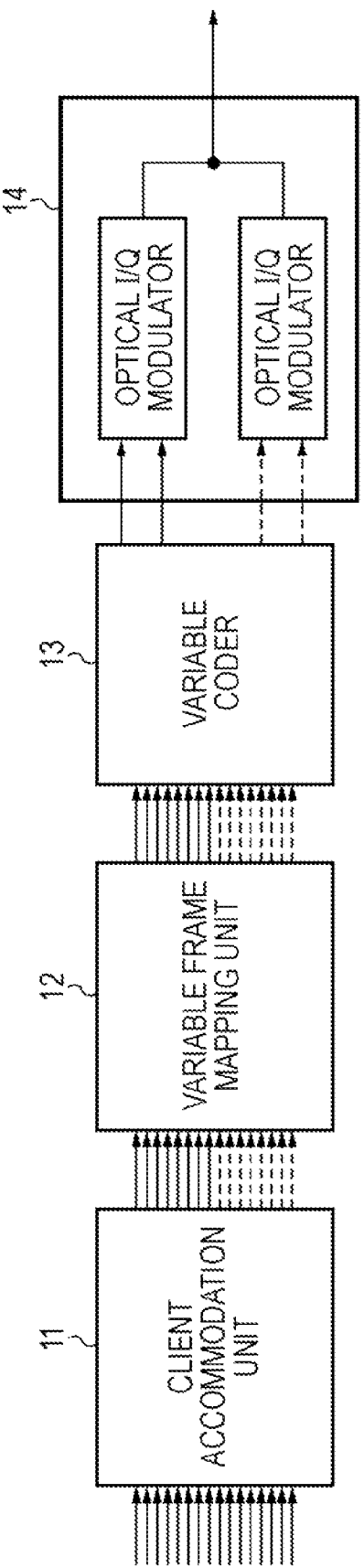

OPTICAL TRANSMITTING DEVICE AND OPTICAL RECEIVING DEVICE

CROSS-REFERENCE TO RELATED APPLICATION

This application is based upon and claims the benefit of priority of the prior Japanese patent application No. 2010-123026, filed on May 28, 2010, the entire contents of which are incorporated herein by reference.

FIELD

The embodiments discussed herein are related to an optical transmitting device and an optical receiving device for receiving an optical signal transmitted from the optical transmitting device.

BACKGROUND

In an optical transmission system that uses wavelength multiplexing, the standardization of OTU (Optical-channel Transport Unit) 4 was completed as a technique used for transmitting a client signal of about 100 Gbit/s per one channel. In addition, for example, in order to realize the long-distance transmission of a signal having a transmission rate of 100 Gbit/s, a modulation method such as Quadrature Phase Shift Keying (QPSK) or the like has been put to practical use. In addition, in order to further increase transmission capacity, a modulation method has been proposed in which a multilevel modulation method such as 16 Quadrature Amplitude Modulation (QAM) or the like, the number of the levels of which is greater than 4, or Orthogonal Frequency Division Multiplexing (OFDM) is used.

However, many of optical transmission devices used in an optical transmission system of the related art constantly operate at maximum transmission rates, regardless of the states of traffic loads or the transmission rates of the physical interfaces of client devices. In this case, since the optical transmission device operates in response to the maximum transmission rate, a stuffing byte, an idle signal, or the like may be transmitted in addition to a data signal. Namely, the transmission efficiency of an optical transmission device of the related art may be reduced, depending on the transmission rate of a client signal. In addition, in this case, since an unnecessary signal is transmitted, useless electric power turns out to be consumed.

As a related technique, there is the following modulation method. Namely, an intersignal distance that is a distance between positions arranged of modulated signals is widened for data having low noise tolerance, and the intersignal distance is narrowed for data having high noise tolerance. For example, in the signal point arrangement of 8PSK, a ratio between the transmission rate of a data bit sequence and the transmission rate of a coded voice information bit sequence is set to 2:1, high 2 bits are allocated to data, and low 1 bit is allocated to a voice signal sequence. In addition, when data communication is not performed, a modulation method is switched to BPSK (Binary Phase Shift Keying), and voice communication is performed. On the contrary, when voice communication is not performed, a modulation method is switched to $\pi/4$ shift QPSK, for example, and data communication is performed. The detection of the switching of a modulation method, which is to be performed on the receiving side, is performed in accordance with switching control information accommodated in a unique word that is located at the front of a frame and modulated with BPSK. An example of the technique is disclosed in Japanese Laid-open patent Publication No. 2004-201131.

In addition, as another related technique, there is a data transmission device in which important data is transmitted and received through a PSK modulator and a PSK demodulator, the state numbers of which are small, and unimportant data is transmitted and received through a PSK modulator and a PSK demodulator, the state numbers of which are large. An example of the technique is disclosed in Japanese Laid-open patent Publication No. 2-278940.

SUMMARY

According to an aspect of the embodiment, there is provided an optical transmitting device including a detector to detect a transmission rate of a transmission signal, a transmission method selector to determine a transmission method of the transmission signal, based on the transmission rate detected by the detector, a modulation signal generator circuit to generate a modulation signal from the transmission signal, based on the transmission method determined by the transmission method selector, and an optical modulator to generate a modulated optical signal from the modulation signal generated by the modulation signal generator circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram explaining an operation of the optical transmitting device;

FIG. 4 is a diagram explaining a transmission method;

FIG. 9 is a diagram explaining a policy for selecting a transmission method;

FIG. 15 is a diagram illustrating a configuration of a transmission method setting unit; and FIGS. 16A and 16B are diagrams illustrating an example of an optical transmitting device.

DESCRIPTION OF EMBODIMENTS

First Embodiment

Figure 1:
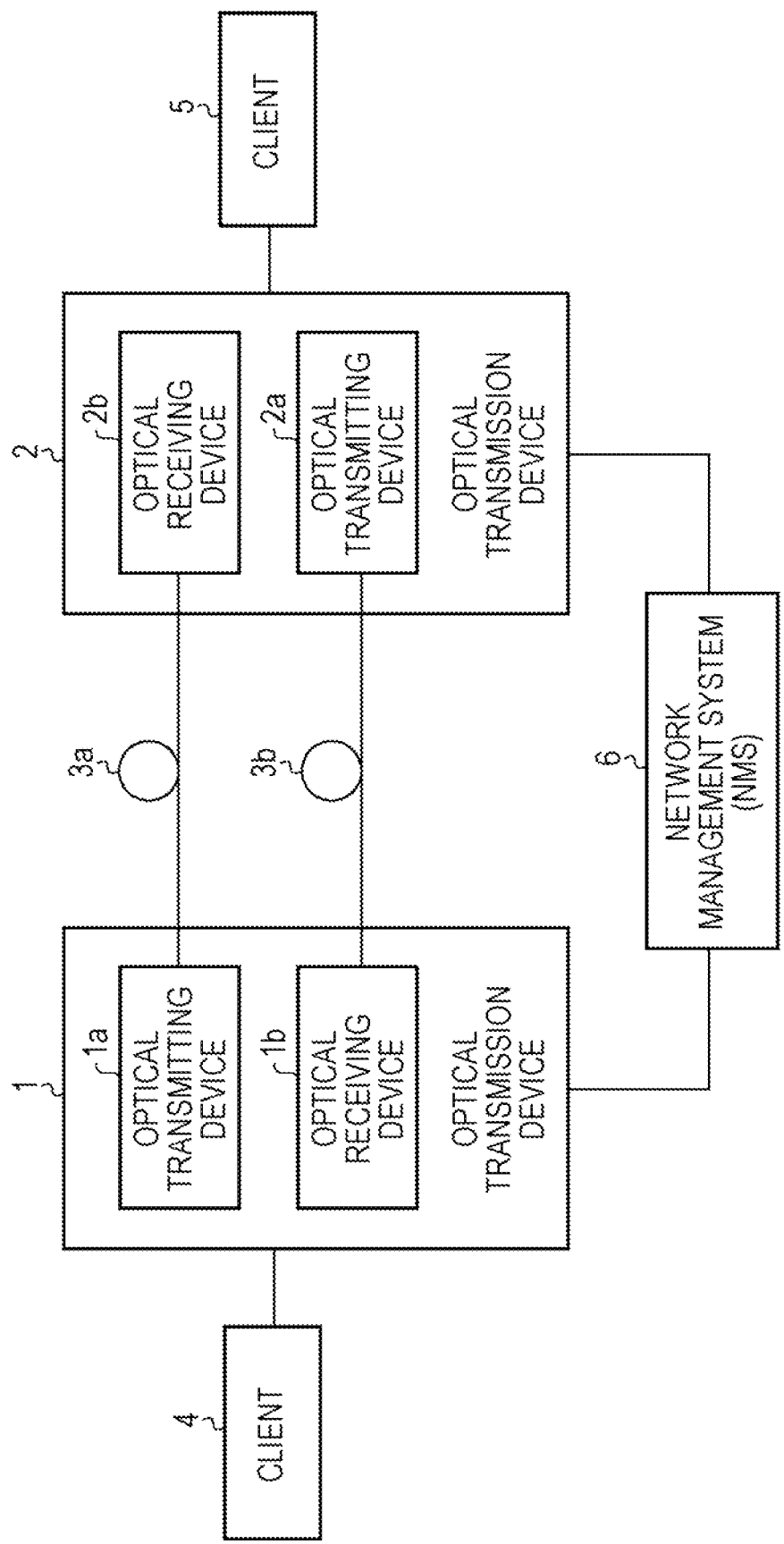
FIG. 1 is a diagram illustrating a configuration of an optical transmission system in which an optical transmitting device and an optical receiving device.

FIG. 1 is a diagram illustrating the configuration of an optical transmission system in which an optical transmitting device and an optical receiving device of an embodiment are used. In FIG. 1, an optical transmission device 1 includes an optical transmitting device 1a and an optical receiving device 1b. In the same way, an optical transmission device 2 includes an optical transmitting device 2a and an optical receiving device 2b. The optical transmitting device 1a and the optical receiving device 2b are connected to each other through an optical transmission path 3a. In the same way, the optical transmitting device 2a and the optical receiving device 1b are connected to each other through an optical transmission path 3b. Here, each of the optical transmission paths 3a and 3b is an optical fiber. In addition, on each of the optical transmission paths 3a and 3b, node devices such as one optical relay or a plurality of optical relays (namely, optical amplifiers), an optical branch insertion device, an optical cross-connect device, and the like may be provided.

The optical transmission device 1 accommodates a client 4, and the optical transmission device 2 accommodates a client 5. A client signal transmitted from the client 4 is converted into an optical signal by the optical transmitting device 1a, and is transmitted to the optical transmission device 2 through the optical transmission path 3a. The optical receiving device 2b re-generates and transmits the client signal from a received signal and to the client 5. In the same way, a client signal transmitted from the client 5 is converted into an optical signal by the optical transmitting device 2a, and is transmitted to the optical transmission device 1 through the optical transmission path 3b. The optical receiving device 1b re-generates and transmits the client signal from a received signal and to the client 4. In addition, the client signal is one example of a transmission signal transmitted from an optical transmitting device to an optical receiving device. Namely, the optical transmitting device of the embodiment may transmit a signal other than the client signal, and the optical receiving device of the embodiment may receive a signal other than the client signal.

Each of the optical transmission devices 1 and 2 is connected to a network management system (NMS) 6. The network management system 6 transmits and receives control signals to and from the optical transmission devices 1 and 2, and hence manages the states and the operations of the optical transmission devices 1 and 2. In addition, the optical transmission devices 1 and 2 can transmit and receive the control signals through the network management system 6.

Figure 2:
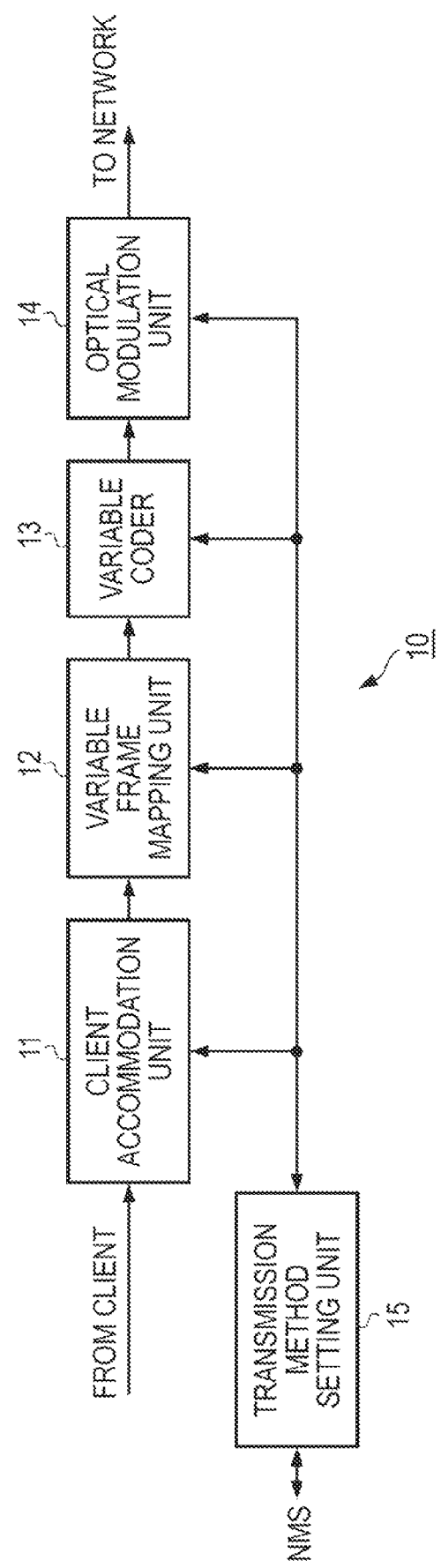
FIG. 2 is a diagram illustrating a configuration of an optical transmitting device.

FIG. 2 is a diagram illustrating the configuration of an optical transmitting device of the embodiment. In the optical transmission system illustrated in FIG. 1, an optical transmitting device 10 of the embodiment corresponds to the optical transmitting device 1a or the optical transmitting device 2a. In addition, the optical transmitting device 10 includes a client accommodation unit 11, a variable frame mapping unit 12, a variable coder 13, an optical modulation unit 14, and a transmission method setting unit 15.

The client accommodation unit 11 is interfaced with a client. Namely, the client accommodation unit 11 terminates a client signal transmitted from the client. In addition, while the client is not specifically limited, the client is a terminal device, for example. In addition, the client may be application software. In this case, for example, the optical transmitting device 10 is embedded or inserted in a computer, and is used.

The variable frame mapping unit 12 allocates the client signal terminated by the client accommodation unit 11 to a predetermined transmission frame. At this time, the variable frame mapping unit 12 performs mapping in accordance with a transmission method selected by the transmission method setting unit 15. The variable coder 13 generates a modulation signal from the above-mentioned client signal. Namely, the variable coder 13 generates the modulation signal used for carrying the transmission frame generated by the variable frame mapping unit 12. At this time, the variable coder 13 generates the modulation signal in accordance with the transmission method selected by the transmission method setting unit 15. The optical modulation unit 14 generates a modulated optical signal from the modulation signal generated by the variable coder 13 and outputs the modulated optical signal. At this time, the optical modulation unit 14 may generate the modulated optical signal in accordance with the transmission method selected by the transmission method setting unit 15.

The transmission method setting unit 15 selects a transmission method corresponding to a transmission rate of the client signal, from among a plurality of transmission methods provided by the optical transmitting device 10. In the example, the transmission rate of the client signal is detected by the client accommodation unit 11. In addition, the transmission method setting unit 15 notifies the variable frame mapping unit 12, the variable coder 13, and the optical modulation unit 14 of transmission method information indicating the selected transmission method. At this time, on the basis of the selected transmission method, the transmission method setting unit 15 may individually create instructions for the variable frame mapping unit 12, the variable coder 13, and the optical modulation unit 14. In this case, the transmission method setting unit 15 individually provides the created instructions to the variable frame mapping unit 12, the variable coder 13, and the optical modulation unit 14. In addition, the transmission method setting unit 15 transmits the above-mentioned transmission method information to the network management system (NMS) 6. Accordingly, the transmission method information is notified to an optical receiving device in a facing device (namely, an optical receiving device for receiving the modulated optical signal transmitted from the optical transmitting device 10).

FIG. 3 is a diagram explaining an operation of the optical transmitting device 10. In addition, in an embodiment illustrated in FIG. 3, the optical transmitting device 10 is capable of selectively using single polarization transmission or polarization multiplexing transmission. In the single polarization transmission (SP: single polarization), a signal is transmitted using one polarization. In the polarization multiplexing transmission, two polarized waves, which are perpendicular to each other, are multiplexed, and thereby two signals are transmitted. Accordingly, compared with the single polarization transmission, the polarization multiplexing transmission provides double transmission capacity. In addition, in the following description, in some cases, the polarization multiplexing transmission is called "dual polarization transmission (DP: dual polarization)". In this regard, however, the present embodiment is not limited to the optical transmitting device that selectively uses the single polarization transmission or the polarization multiplexing transmission. Namely, the present embodiment may be applied to an optical transmitting device that does not perform the polarization multiplexing. In addition, the present embodiment may also be applied to an optical transmitting device that constantly transmits a signal using the polarization multiplexing.

The client accommodation unit 11 terminates the client signal transmitted from the client, and transfers the client signal to the variable frame mapping unit 12. At this time, the client signal is sent to the variable frame mapping unit 12 through a parallel interface including a plurality of signal lines.

The client accommodation unit 11 includes at least one of an effective bandwidth monitor 11a or a physical layer bit-rate discriminator 11b. When the client signal is a packet signal, the effective bandwidth monitor 11a detects the effective bandwidth of the client signal by monitoring the size (or, data length) of each input packet. In addition, the physical layer bit-rate discriminator 11b directly detects a transmission bit rate of the client signal. In this way, the effective bandwidth monitor 11a and the physical layer bit-rate discriminator 11b practically detect the transmission rate of the client signal. In addition, the transmission rate of the client signal, detected in the client accommodation unit 11, is notified to the transmission method setting unit 15.

The transmission method setting unit 15 includes a method selector 15a, a facing-device interface 15b, and a method setting unit 15c. The method selector 15a selects a transmission method corresponding to the transmission rate of the client signal, from among a plurality of transmission methods provided by the optical transmitting device 10.

As illustrated in FIG. 4, the optical transmitting device 10 provides, as modulation methods, BPSK (Binary Phase Shift Keying), QPSK (Quadrature Phase Shift Keying), 8PSK (Phase Shift Keying), 16PSK, 32PSK, 64PSK, 128PSK, and 256PSK. By using the BPSK, 1 bit of data per 1 symbol is transmitted. By using the QPSK, 2 bits of data per 1 symbol is transmitted. In the same way, by using the 8PSK, the 16PSK, the 32PSK, the 64PSK, the 128PSK, and the 256PSK, 3 bits, 4 bits, 5 bits, 6 bits, 7 bits, and 8 bits of data per 1 symbol are transmitted, respectively. In addition, in place of the 16PSK, the 32PSK, the 64PSK, the 128PSK, and the 256PSK, 16QAM, 32QAM, 64QAM, 128QAM, and 256QAM may also be provided, respectively.

As described above, the optical transmitting device 10 may selectively use the single polarization transmission (SP) or the dual polarization transmission (DP). Here, the optical transmitting device 10 may combine the single polarization transmission (SP) or the dual polarization transmission (DP) with each modulation method. Accordingly, the optical transmitting device 10 provides 16 transmission methods illustrated in FIG. 4. In addition, for example, SP-BPSK indicates a transmission method in which a BPSK modulated optical signal is transmitted using the single polarization, and DP-BPSK indicates a transmission method in which two BPSK modulated optical signals are transmitted using the polarization multiplexing.

In the embodiment, the optical transmitting device 10 transmits a signal at a transmission rate of 6.25 G symbols per second. Namely, a minimum transmission rate for interfacing with a client, provided by the optical transmitting device 10, is 6.25 Gbit/s. In addition, the minimum transmission rate is realized using the SP-BPSK. In addition, each of the other transmission methods transmits a signal at a rate that is the integral multiple of the transmission rate of the SP-BPSK. For example, the transmission rate of the DP-BPSK is 12.5 Gbit/s, and the transmission rate of SP-QPSK is also 12.5 Gbit/s.

The method selector 15a selects a transmission method corresponding to the transmission rate of the client signal, from 16 transmission methods illustrated in FIG. 4. At this time, for example, the method selector 15a selects a transmission method that is the slowest in transmission methods capable of transmitting the client signal. For example, when the transmission rate of the client signal is 75 Gbit/s, the optical transmitting device 10 may transmit the client signal using one of DP-64PSK, DP-128PSK, and DP-256PSK. In this case, the method selector 15a selects the DP-64PSK from among the three transmission methods mentioned above. In the same way, when the transmission rate of the client signal is 60 Gbit/s, DP-32PSK is selected as the corresponding transmission method. In addition, the selection method for the transmission method will be further described later.

The facing-device interface 15b notifies a facing device of the optical transmitting device 10 of the transmission method selected by the method selector 15a. At this time, the facing-device interface 15b transmits, to the network management system, transmission method information indicating the selected transmission method. Subsequently, the network management system transfers the transmission method information to the facing device. In addition, the facing device is an optical transmission device that includes an optical receiving device used for receiving the modulated optical signal transmitted from the optical transmitting device 10.

The method setting unit 15c notifies the variable frame mapping unit 12, the variable coder 13, and the optical modulation unit 14 of the transmission method selected by the method selector 15a. Alternatively, the method setting unit 15c may individually create instructions for the variable frame mapping unit 12, the variable coder 13, and the optical modulation unit 14 on the basis of the transmission method selected by the method selector 15a, and may individually provide the created instructions to the variable frame mapping unit 12, the variable coder 13, and the optical modulation unit 14. In any of these cases, the variable frame mapping unit 12, the variable coder 13, and the optical modulation unit 14 individually operate on the basis of the transmission method selected by the method selector 15a.

The variable frame mapping unit 12 includes a mapping unit 12a and a frame controller 12b. In accordance with the control of the frame controller 12b, the mapping unit 12a maps the client signal to one predetermined transmission frame or a plurality of predetermined transmission frames. In accordance with the transmission method selected by the transmission method setting unit 15, the frame controller 12b controls the mapping operation of the mapping unit 12a. Now, it is used that "map" means "allocate" therein.

The variable coder 13 includes a coding processor 13a and a coding controller 13b. In accordance with the control of the coding controller 13b, the coding processor 13a generates a modulation signal from one transmission frame or a plurality of transmission frames generated by the variable frame mapping unit 12. In accordance with the transmission method selected by the transmission method setting unit 15, the coding controller 13b controls the operation of the coding processor 13a. At this time, when a transmission method utilizing the polarization multiplexing is selected, an X-polarization modulation signal and a Y-polarization modulation signal are generated as modulation signals. In addition, when a transmission method that does not utilize the polarization multiplexing is selected, one of the X-polarization modulation signal and the Y-polarization modulation signal is generated as a modulation signal.

The optical modulation unit 14 includes optical modulators 14X and 14Y and a polarization beam coupler (PBC) 14Z. The optical modulators 14X and 14Y are driven by the X-polarization modulation signal and the Y-polarization modulation signal, respectively. Namely, the optical modulator 14X generates an X-polarization modulated optical signal from the X-polarization modulation signal. In the same way, the optical modulator 14Y generates a Y-polarization modulated optical signal from the Y-polarization modulation signal.

The polarization beam coupler 14Z polarization-multiplexes the X-polarization modulated optical signal and the Y-polarization modulated optical signal, generated by the optical modulators 14X and 14Y, respectively, so as to generate a modulated optical signal. In addition, when only one of the X-polarization modulated optical signal and the Y-polarization modulated optical signal is generated, the polarization beam coupler 14Z outputs the generated signal, as a modulated optical signal.

Next, the operation of the optical transmitting device 10 will be described. In the optical transmitting device 10 having such a configuration as described above, the method selector 15*a* in the transmission method setting unit 15 selects a transmission method corresponding to the transmission rate of the client signal. In the embodiment, the transmission method corresponding to the transmission rate of the client signal is selected from among 16 transmission methods illustrated in FIG. 4. In addition, the selected transmission method is notified to the variable frame mapping unit 12, the variable coder 13, and the optical modulation unit 14.

The variable frame mapping unit 12 is capable of creating a plurality of transmission frames to be transmitted in parallel with one another. In the embodiment, the variable frame mapping unit 12 is capable of creating up to 16 transmission frames X1 to X8 and Y1 to Y8. In addition, the number "16" corresponds to the number of bits per 1 symbol of DP-256PSK that is the fastest transmission method provided by the optical transmitting device 10.

The variable frame mapping unit 12 maps the client signal to transmission frames having the number of which corresponds to the transmission method. For example, SP-BPSK transmits 1 bit of data per 1 symbol. Accordingly, when the SP-BPSK is selected, the variable frame mapping unit 12 maps the client signal to one transmission frame in each frame time. In addition, it is assumed that the created transmission frame is fixed for the transmission method. In the embodiment, when the SP-BPSK is selected, a transmission frame X1 is created.

By using the SP-QPSK, 2 bits of data per 1 symbol are transmitted. Accordingly, when the SP-QPSK is selected, the variable frame mapping unit 12 maps the client signal to two transmission frames in each frame time. At this time, the client signal is mapped to transmission frames X1 and X2. In addition, by using the DP-QPSK, 4 bits of data per 1 symbol are transmitted. Accordingly, when the DP-QPSK is selected, the variable frame mapping unit 12 maps the client signal to four transmission frames in each frame time. At this time, the client signal is mapped to transmission frames X1 to X2 and Y1 to Y2. In the same way, when each of the other transmission methods is selected, the client signal is mapped to a corresponding transmission frame, as illustrated in FIG. 4.

Figure 5:
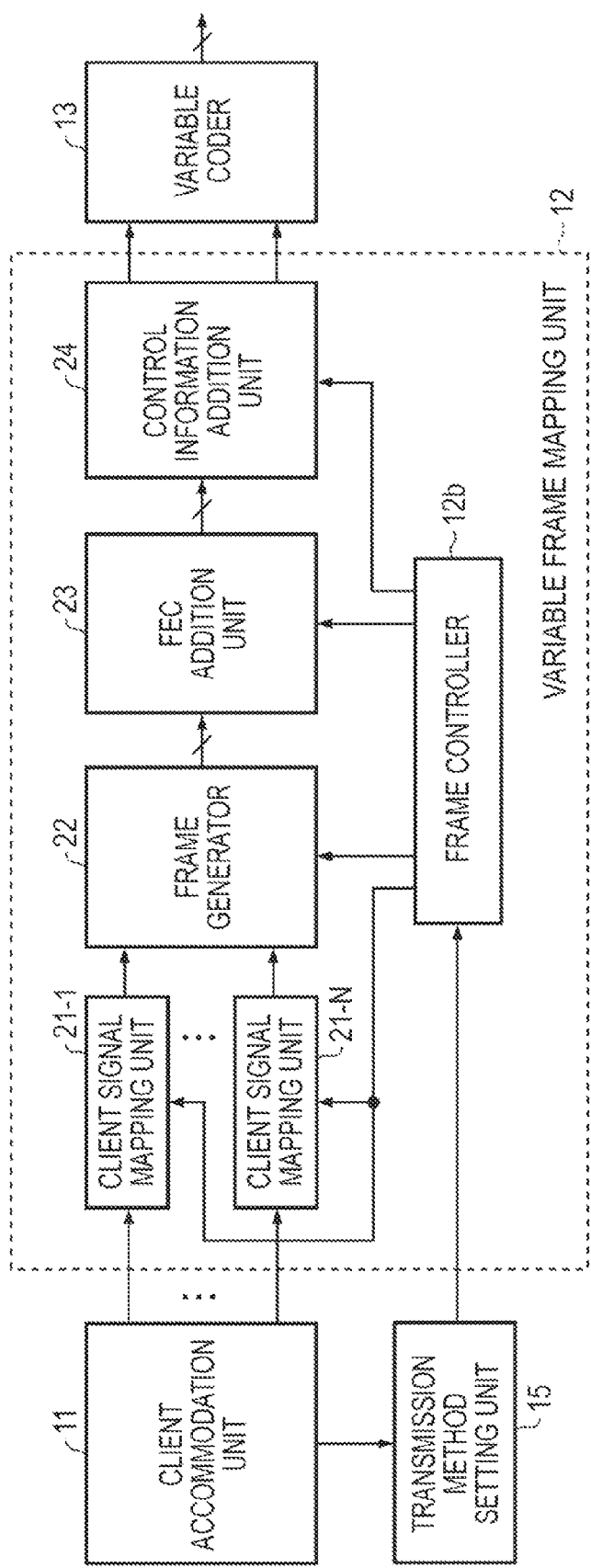
FIG. 5 is a diagram illustrating a configuration of a variable frame mapping unit.

FIG. 5 is a diagram illustrating the configuration of the variable frame mapping unit 12. The variable frame mapping unit 12 includes a plurality of client signal mapping units 21-1 to 21-N, a frame generator 22, an FEC (Forward Error Correction) addition unit 23, a control information addition unit 24, and the frame controller 12*b*. In addition, an unit including the client signal mapping units 21-1 to 21-N, the frame generator 22, the FEC addition unit 23, and the control information addition unit 24 corresponds to the mapping unit 12*a* illustrated in FIG. 3. In addition, the variable frame mapping unit 12 generates a transmission frame illustrated in FIG. 6.

The client signal is input to each of the client signal mapping units 21-1 to 21-N. The number "N" corresponds to the number of bits per 1 symbol of the fastest transmission method provided by the optical transmitting device 10. In the embodiment, the fastest transmission method is the DP-256PSK, and the number "N" is 16.

The frame controller 12*b* activates one client signal mapping unit 21 or a plurality of client signal mapping units 21, which correspond to the transmission method, from among the client signal mapping units 21-1 to 21-N. For example, when the SP-BPSK is selected, one client signal mapping unit 21 is activated in order to transmit the client signal using one transmission lane. In addition, when the SP-QPSK is selected, two client signal mapping units 21 are activated in order to transmit the client signal using two transmission lanes.

Figure 6:
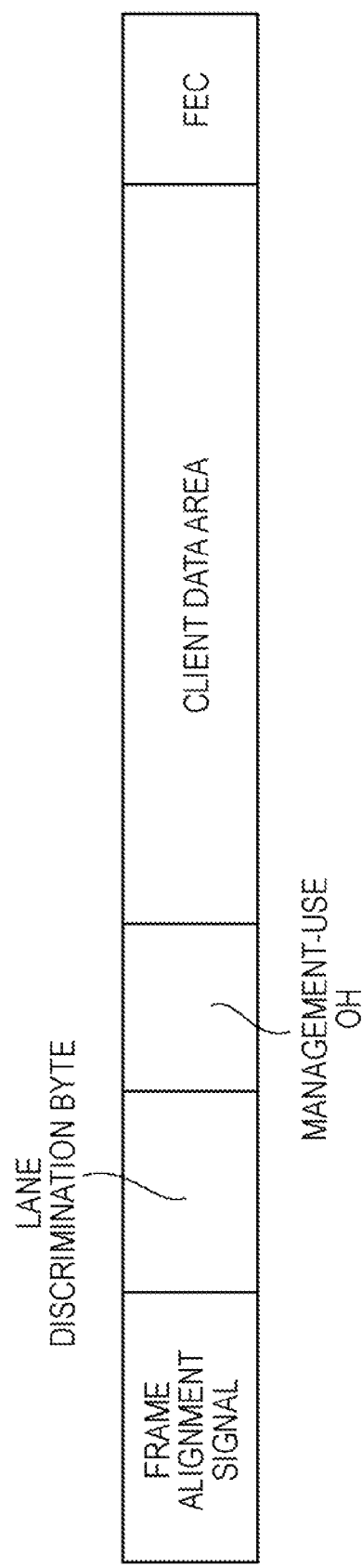
FIG. 6 is a diagram illustrating a configuration of a transmission frame.

The client signal mapping unit 21 extracts data having a predetermined length from the client signal, and allocates the data in a client data area illustrated in FIG. 6. When a plurality of client signal mapping units 21 operate, the plural client signal mapping units 21 sequentially extract data having a predetermined length from the client signal. For example, when the client signal is transmitted using four transmission frames X1 to X4, four client signal mapping units 21-1 to 21-4 are activated. In addition, while not being specifically limited, the client signal mapping units 21-1 to 21-4 sequentially extract m bits of data from the client signal, and allocate the m bits of data in a corresponding transmission frame. Here, the number "m" corresponds to the length of the client data area in the transmission frame. In addition, the client signal mapping unit 21 may insert a stuffing byte or an idle signal into the client data area, as necessary. In addition, the client signal mapping unit 21 may execute jitter absorption processing.

The frame generator 22 adds a management-use overhead to each client data. The FEC addition unit 23 adds FEC data to each client data. The control information addition unit 24 adds a frame alignment signal and a lane discrimination byte to each client data. In the embodiment, the frame alignment signal has 5 bytes, and, for example, "F6F6F62828" (a hexadecimal number) is allocated to the frame alignment signal. The lane discrimination byte discriminates a transmission frame selected from among the transmission frames X1 to X8 and Y1 to Y8. At this time, for example, using low 4 bits of the lane discrimination byte, a transmission frame selected from among the transmission frames X1 to X8 is discriminated, and using high 4 bits of the lane discrimination byte, a transmission frame selected from among the transmission frames Y1 to Y8 is discriminated. For example, "00000001" used for discriminating "X1" is added to the transmission frame X1. In addition, "00000010" used for discriminating "X2" is added to the transmission frame X2. Furthermore, "00010000" used for discriminating "Y1" is added to the transmission frame Y1. The same way is also applied to another transmission frame.

In this way, the variable frame mapping unit 12 generates one transmission frame or a plurality of transmission frames in accordance with the transmission method. In addition, the lane discrimination byte used for discriminating the transmission frame selected from among the transmission frames X1 to X8 and Y1 to Y8 is added to each transmission frame.

In addition, as illustrated in FIG. 6, in addition to the client data, the management-use overhead (OH), the FEC, the frame alignment signal, and the lane discrimination byte are allocated in the transmission frame. Accordingly, as illustrated in FIG. 4, the actual transmission rate of each transmission method is faster than a transmission rate of the client signal transmitted from the client. In the embodiment, an overhead of about 7 percent occurs.

One transmission frame or a plurality of transmission frames generated by the variable frame mapping unit 12 in the way described above are transmitted to the variable coder 13. When the plural transmission frames are generated, the plural transmission frames are transmitted to the variable coder 13 in parallel.

Figure 7:
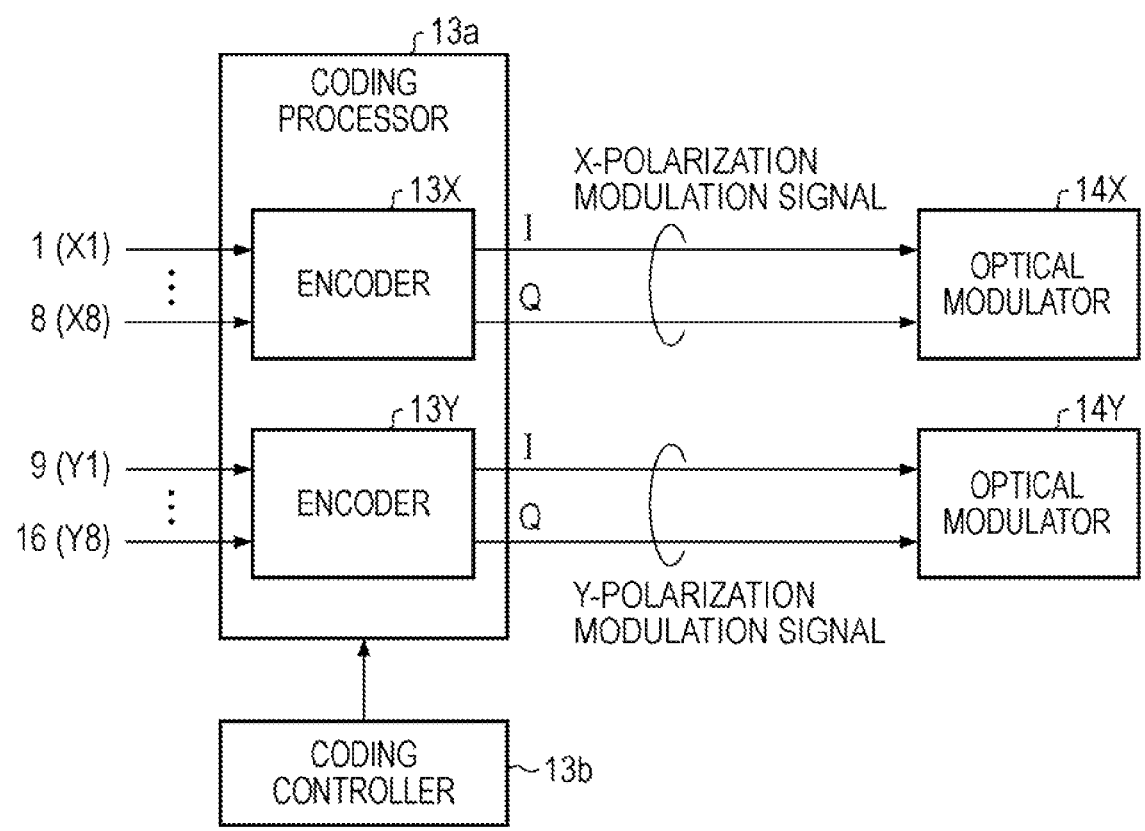
FIG. 7 is a diagram illustrating a configuration of a variable coder.

As described above, the variable coder 13 includes the coding processor 13a and the coding controller 13b. In addition, as illustrated in FIG. 7, the coding processor 13a includes encoders 13X and 13Y. In accordance with the transmission method, the encoder 13X generates the X-polarization modulation signal from the transmission frames X1 to X8. The X-polarization modulation signal is expressed by an I-component signal and a Q-component signal used for driving the optical modulator 14X. In addition, in accordance with the transmission method, the encoder 13Y generates the Y-polarization modulation signal from the transmission frames Y1 to Y8. The Y-polarization modulation signal is expressed by an I-component signal and a Q-component signal used for driving the optical modulator 14Y.

When the SP-BPSK or the DP-BPSK is selected by the method selector 15a, the encoder 13X generates an X-polarization modulation signal of BPSK from the transmission frame X1. The X-polarization modulation signal of BPSK is an X-polarization modulation signal used for driving the optical modulator 14X and the optical modulator 14X generates a BPSK modulated optical signal. In addition, when the SP-QPSK or the DP-QPSK is selected by the method selector 15a, the encoder 13X generates an X-polarization modulation signal of QPSK from the transmission frames X1 to X2. The X-polarization modulation signal of QPSK is an X-polarization modulation signal used for driving the optical modulator 14X and the optical modulator 14X generates a QPSK modulated optical signal.

In the same way, when the SP-8PSK or the DP-8PSK is selected, the encoder 13X generates an X-polarization modulation signal of 8PSK from the transmission frames X1 to X3. When the SP-16PSK or the DP-16PSK is selected, an X-polarization modulation signal of 16PSK is generated from the transmission frames X1 to X4. When the SP-32PSK or the DP-32PSK is selected, an X-polarization modulation signal of 32PSK is generated from the transmission frames X1 to X5. When the SP-64PSK or the DP-64PSK is selected, an X-polarization modulation signal of 64PSK is generated from the transmission frames X1 to X6. When the SP-128PSK or the DP-128PSK is selected, an X-polarization modulation signal of 128PSK is generated from the transmission frames X1 to X7. When the SP-256PSK or the DP-256PSK is selected, an X-polarization modulation signal of 256PSK is generated from the transmission frames X1 to X8.

The operation of the encoder 13Y is basically the same as that of the encoder 13X. In this regard, however, when a transmission method (SP-BPSK, SP-QPSK, . . . , or SP-256PSK) utilizing the single polarization transmission is selected, the encoder 13Y does not operate. Namely, when the DP-BPSK is selected by the method selector 15a, the encoder 13Y generates a Y-polarization modulation signal of BPSK from the transmission frame Y1. In addition, when the DP-QPSK is selected by the method selector 15a, the encoder 13Y generates a Y-polarization modulation signal of QPSK from the transmission frames Y1 to Y2. In the same way, when the DP-8PSK is selected, a Y-polarization modulation signal of 8PSK is generated from the transmission frames Y1 to Y3. When the DP-16PSK is selected, a Y-polarization modulation signal of 16PSK is generated from the transmission frames Y1 to Y4. When the DP-32PSK is selected, a Y-polarization modulation signal of 32PSK is generated from the transmission frames Y1 to Y5. When the DP-64PSK is selected, a Y-polarization modulation signal of 64PSK is generated from the transmission frames Y1 to Y6. When the DP-128PSK is selected, a Y-polarization modulation signal of 128PSK is generated from the transmission frames Y1 to Y7. In addition, when the DP-256PSK is selected, a Y-polarization modulation signal of 256PSK is generated from the transmission frames Y1 to Y8.

In this way, when a transmission method (DP-BPSK, DP-QPSK, . . . , or DP-256PSK) utilizing the polarization multiplexing is selected, the encoder 13X and the encoder 13Y operate, and the X-polarization modulation signal and the Y-polarization modulation signal are output from the coding processor 13a. On the other hand, when a transmission method (SP-BPSK, SP-QPSK, . . . , or SP-256PSK) utilizing the single polarization is selected, only the encoder 13X operates, and only the X-polarization modulation signal is output from the coding processor 13a.

In addition, for example, the coding processor 13a is realized using a set of encoders provided in parallel with one another. Alternatively, the coding processor 13a may be realized with a processor that executes an encode program. In this case, a set of encode programs corresponding to the encoders 13X and 13Y may be executed in parallel or alternately executed in a time-division multiplex method.

As described above, the optical modulation unit 14 includes the optical modulators 14X and 14Y. The optical modulator 14X generates the X-polarization modulated optical signal from the X-polarization modulation signal. In addition, the optical modulator 14Y generates the Y-polarization modulated optical signal from the Y-polarization modulation signal. Accordingly, when a transmission method utilizing polarization multiplexing is selected, the variable coder 13 generates the X-polarization modulation signal and the Y-polarization modulation signal, and both the optical modulators 14X and 14Y operate. In this case, the optical modulators 14X and 14Y generate a set of modulated optical signals. In addition, a set of modulated optical signals is multiplexed by the polarization beam coupler (PBC) 14Z and output. For example, when the DP-QPSK is selected, a set of QPSK modulated optical signals is generated by the optical modulators 14X and 14Y, and furthermore, a DP-QPSK modulated optical signal is generated by the PBC 14Z.

On the other hand, when a transmission method utilizing the single polarization is selected, the variable coder 13 does not generate the Y-polarization modulation signal, and the optical modulator 14Y does not operate. In this case, one modulated optical signal is generated by the optical modulator 14X and output. For example, when the SP-QPSK is selected, the optical modulator 14X generates a QPSK modulated optical signal, and an SP-QPSK modulated optical signal is output through the PBC 14Z.

As described above, the optical transmitting device 10 of the embodiment transmits the client signal in accordance with a transmission method selected from among the plural transmission methods. At this time, as described above, the method selector 15a selects the transmission method corresponding to the transmission rate of the client signal. In this regard, however, for example, when the transmission rate of the client signal is 25 Gbit/s, the DP-QPSK and the SP-16PSK are selection targets as the corresponding transmission method in the example illustrated in FIG. 4.

When the plural transmission methods correspond to the client signal, the method selector 15a selects one transmission method on the basis of a predetermined policy. On the basis of one of the following two policies, the optical transmitting device 10 of the embodiment selects a transmission method.

Policy 1: the power consumption of the optical transmitting device 10 is to be reduced.

Policy 2: the quality of a signal is to be improved.

When the policy 1 is adopted, the method selector 15a preferentially selects a transmission method in which the single polarization is used rather than a transmission method in which the polarization multiplexing is used. For example, when it is assumed that the DP-QPSK and the SP-16PSK correspond to the client signal, the SP-16PSK is selected. Here, when the transmission method in which the polarization multiplexing is used is selected, both the encoders 13X and 13Y operate in the variable coder 13, and both the optical modulators 14X and 14Y operate in the optical modulation unit 14. On the other hand, when the transmission method in which a signal is transmitted using the single polarization is selected, only the encoder 13X operates in the variable coder 13, and only the optical modulator 14X operates in the optical modulation unit 14. Namely, in this case, the encoder 13Y halts in the variable coder 13, and the optical modulator 14Y halts in the optical modulation unit 14. Accordingly, while the DP-QPSK and the SP-16PSK provide the same client accommodation rate, power consumption when a signal is transmitted using the SP-16PSK is reduced compared with a case in which the DP-QPSK is selected.

In addition, usually, the power consumption of a transmitting device for the 16PSK is larger than that of the QPSK. However, usually, the power consumption of a transmitting device for the 16PSK is less than twice the power consumption of a transmitting device for the QPSK. Accordingly, the power consumption of a transmitting device for the SP-16PSK is less than that of the DP-QPSK.

When the policy 2 is adopted, the method selector 15a preferentially selects a transmission method in which the number of bits per 1 symbol is small. Here, usually, when a distance between signal points on a phase plane is small, the quality of a transmission signal is reduced. Namely, when the number of bits per 1 symbol is large, the quality of a transmission signal is reduced. Consequently, if a transmission method utilizing a modulation method in which the number of bits per 1 symbol is small is selected, the quality of a transmission signal is improved. For example, it is assumed that the DP-QPSK and the SP-16PSK correspond to the client signal. Here, the QPSK transmits 2 bits of data per 1 symbol, and the 16PSK transmits 4 bits of data per 1 symbol. Accordingly, in this case, the DP-QPSK is selected.

Figure 8:
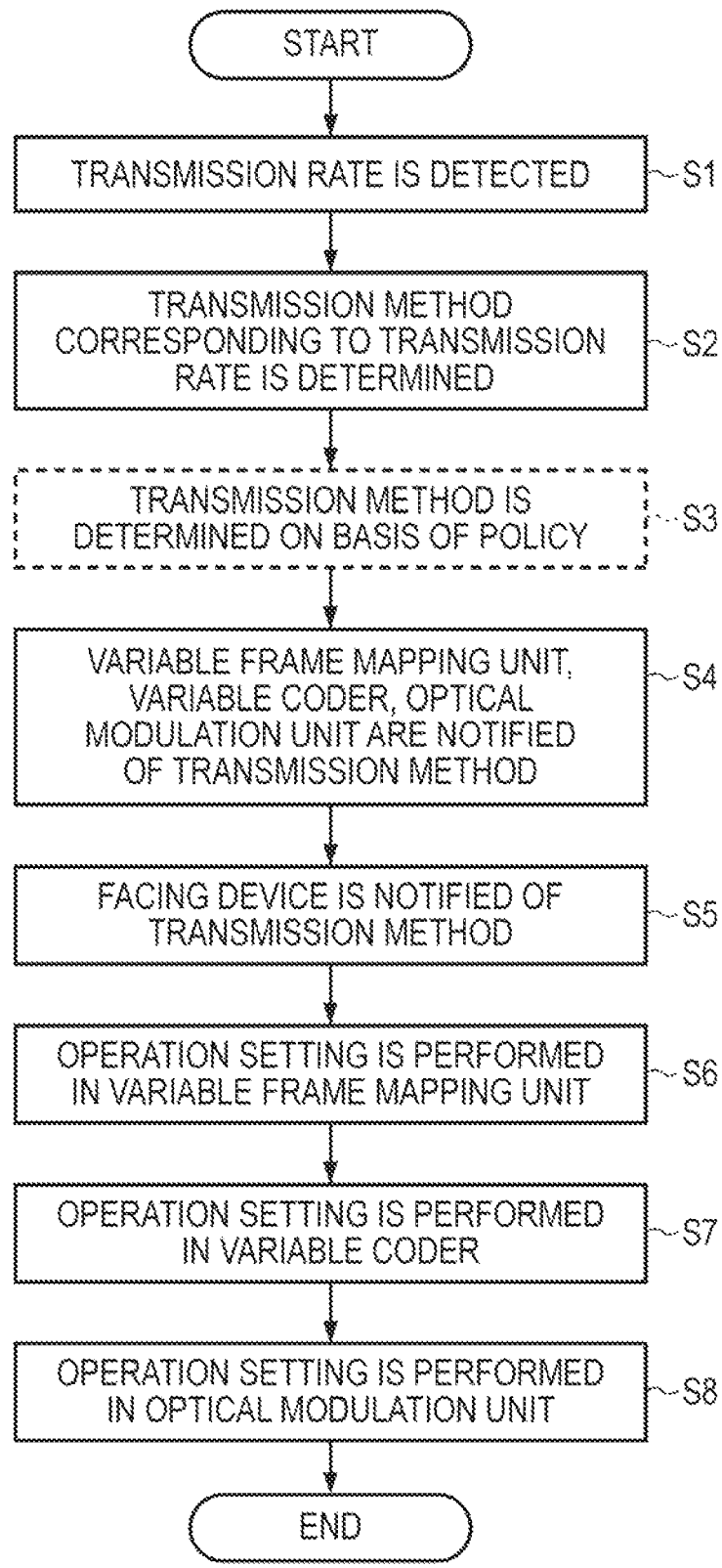
FIG. 8 is a flowchart illustrating a procedure for determining a transmission method in the optical transmitting device.

FIG. 8 is a flowchart illustrating a procedure for determining a transmission method in the optical transmitting device. For example, the processing illustrated in the flowchart is executed at the start of communication. Alternatively, the processing illustrated in the flowchart may be periodically executed.

In Step S1, the client accommodation unit 11 detects the transmission rate of the client signal. Namely, the effective bandwidth or the physical layer bit-rate of the client signal is monitored. In addition, the client accommodation unit 11 notifies the transmission method setting unit 15 of the detected transmission rate.

In Step S2, the method selector 15a determines a transmission method corresponding to the transmission rate of the client signal, from among a plurality of transmission methods provided by the optical transmitting device 10. At this time, when a plurality of transmission methods correspond to the transmission rate, a processing operation performed in Step S3 is executed.

In Step S3, on the basis of a predetermined policy, the transmission method selector 15a selects one transmission method from among the plural transmission methods corresponding to the transmission rate. At this time, the policy 1 in which power consumption is to be reduced is adopted, high priority is assigned to a transmission method in which a signal is transmitted using the single polarization, as illustrated in FIG. 9. Accordingly, in this case, a transmission method in which a signal is transmitted using the single polarization is selected. For example, when the rate of 25 Gbit/s is provided as the transmission rate, the SP-16PSK is selected from among the DP-QPSK and the SP-16PSK.

On the other hand, when the policy 2 is adopted in which the quality of a signal is emphasized, high priority is assigned to a transmission method utilizing a modulation method in which the number of bits per 1 symbol is small. Accordingly, in this case, a transmission method utilizing a modulation method in which the number of bits per 1 symbol is small is selected. For example, when the transmission rate of 25 Gbit/s is provided, the DP-QPSK is selected from among the DP-QPSK and the SP-16PSK.

In Step S4, the modulation method setting unit 15c notifies the variable frame mapping unit 12, the variable coder 13, and the optical modulation unit 14 of the transmission method selected in Step S2 or Step S3. In addition, in Step S5, the facing-device interface 15b notifies the network management system (NMS) of the transmission method selected in Step S2 or Step S3. In addition, the NMS transfers the notification from the facing-device interface 15b to the facing device.

In Step S6, the variable frame mapping unit 12 performs operation setting in accordance with the transmission method given notice of. In Step S7, the variable coder 13 performs operation setting in accordance with the transmission method given notice of. In Step S8, the optical modulation unit 14 performs operation setting in accordance with the transmission method given notice of.

In addition, an execution sequence of individual steps illustrated in FIG. 8 is one example, and the execution sequence is not limited to the example. For example, Step S5 may be executed before Step S4. In addition, the execution sequence of Step S6 to Step S8 is arbitrary, and Step S6 to Step S8 may be executed in parallel.

Figure 10:
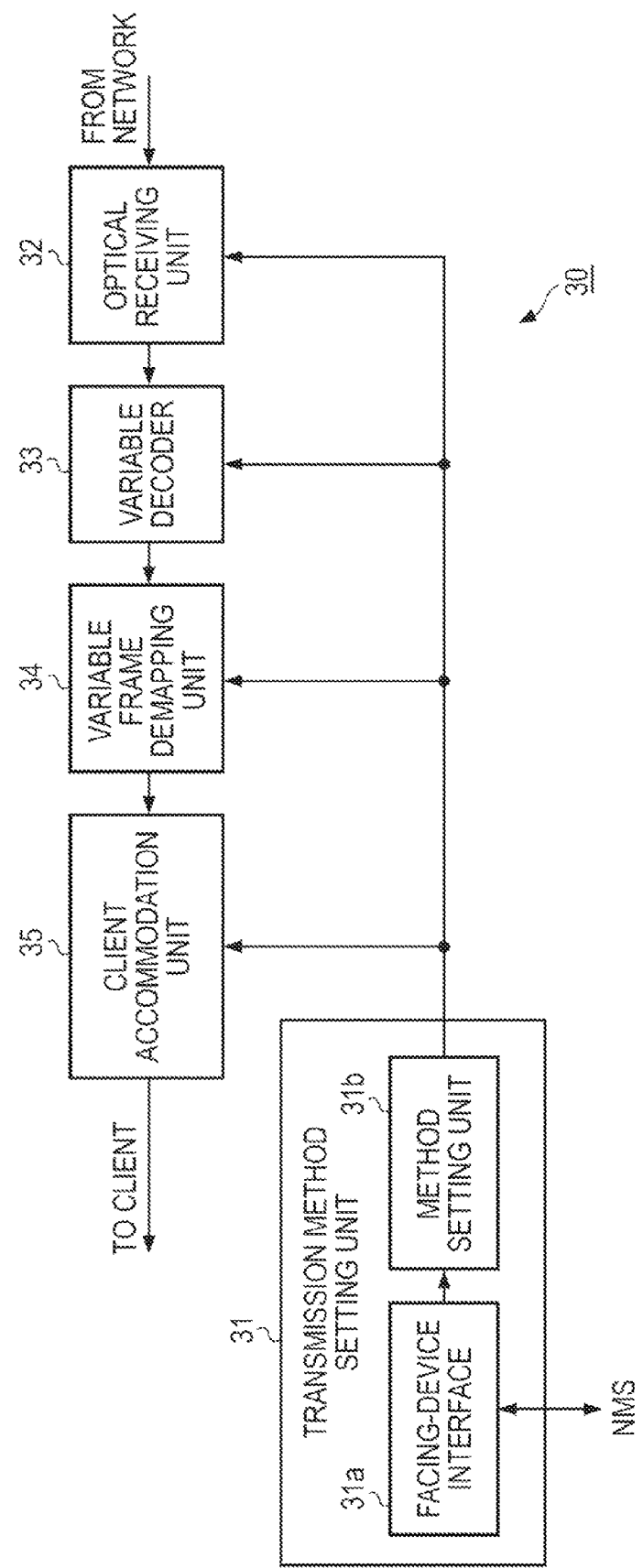
FIG. 10 is a diagram illustrating a configuration of the optical receiving device.

FIG. 10 is a diagram illustrating the configuration of the optical receiving device of the embodiment. An optical receiving device 30 corresponds to the optical receiving device 1b or the optical receiving device 2b in the optical transmission system illustrated in FIG. 1. The optical receiving device 30 includes a transmission method setting unit 31, an optical receiving unit 32, a variable decoder 33, a variable frame demapping unit 34, and a client accommodation unit 35.

The transmission method setting unit 31 includes a facing-device interface 31a and a method setting unit 31b. The facing-device interface 31a receives transmission method information from a facing device. In the embodiment, the facing device corresponds to the optical transmitting device 10 illustrated in FIG. 2. The transmission method information indicates the transmission method selected in the optical transmitting device 10. In addition, the facing-device interface 31a receives the transmission method information through the network management system (NMS). In addition, the method setting unit 31b notifies the optical receiving unit 32, the variable decoder 33, the variable frame demapping unit 34, and the client accommodation unit 35 of the transmission method selected in the optical transmitting device 10.

The optical receiving unit 32 detects a signal indicating the optical phase and the optical intensity of an input modulated optical signal. At this time, the optical receiving unit 32 receives a modulated optical signal in response to the transmission method of which the transmission method setting unit 31 notifies. In addition, the modulated optical signal is generated by the optical transmitting device 10 illustrated in FIG. 2, is transmitted through an optical transmission path, and is received by the optical receiving device 30.

The variable decoder 33 re-generates a transmission frame from an output signal from the optical receiving unit 32. At this time, the variable decoder 33 performs decoding processing in accordance with the transmission method of which the transmission method setting unit 31 notifies. In addition, the decoding performed by the variable decoder 33 corresponds to the encoding performed by the variable coder 13.

The variable frame demapping unit 34 re-generates the client signal from the transmission frame re-generated by the variable decoder 33. At this time, the variable frame demapping unit 34 performs demapping processing in accordance with the transmission method of which the transmission method setting unit 31 notifies. In addition, the demapping performed by the variable frame demapping unit 34 corresponds to the mapping processing performed by the variable frame mapping unit 12.

The client accommodation unit 35 is interfaced with a client. Namely, the client accommodation unit 35 provides an interface between the client and the optical receiving device 30. In addition, the client accommodation unit 35 transmits to the client the client signal re-generated by the variable frame demapping unit 34.

In this way, on the basis of the transmission method information of which the optical transmitting device 10 notifies, the optical receiving device 30 re-generates the client signal from the input modulated optical signal. The procedure used for re-generating the client signal from the modulated optical signal in the optical receiving device 30 basically corresponds to the inverse process of the procedure used for generating the modulated optical signal from the client signal in the optical transmitting device 10.

Figure 11:
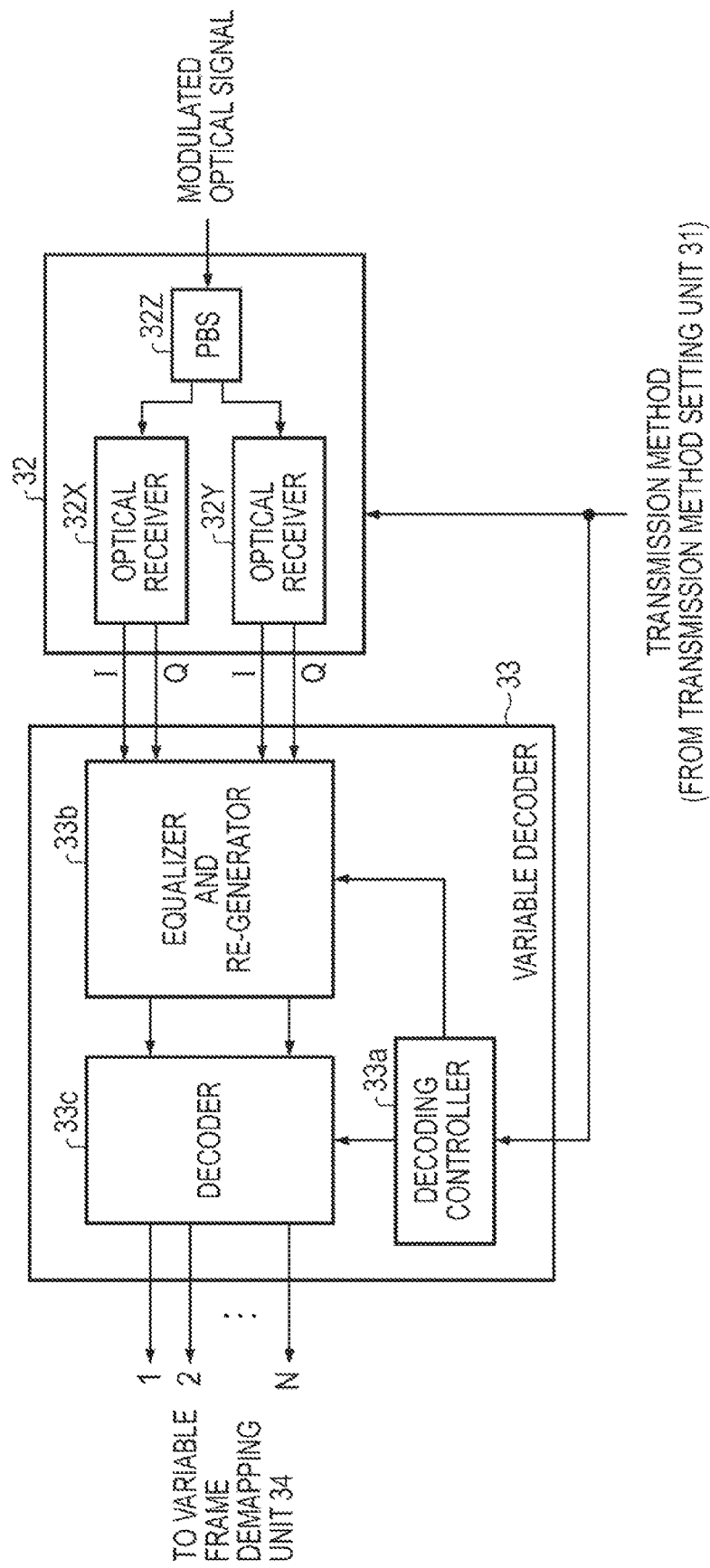
FIG. 11 is a diagram illustrating configurations of an optical receiving unit and a variable decoder.

FIG. 11 is a diagram illustrating the configurations of the optical receiving unit 32 and the variable decoder 33. While the optical receiving unit 32 is not specifically limited, the optical receiving unit 32 includes a polarization beam splitter (PBS) 32Z and optical receivers 32X and 32Y, for example. In addition, in accordance with the transmission method selected in the optical transmitting device 10, the optical receiving unit 32 performs the following operation.

When a transmission method utilizing the polarization multiplexing is selected in the optical transmitting device 10, the PBS 32Z separates the modulated optical signal into an X-polarization optical signal and a Y-polarization optical signal, which are perpendicular to each other. The optical receiver 32X detects a signal indicating the optical phase and the optical intensity of the X-polarization optical signal. Namely, the I component and the Q component of the X-polarization optical signal are detected. In the same way, the optical receiver 32Y detects a signal indicating the I component and the Q component of the Y-polarization optical signal. On the other hand, when a transmission method in which the polarization multiplexing is not utilized is selected in the optical transmitting device 10, the optical receiving unit 32 detects a pair of an I component and a Q component from the modulated optical signal.

The variable decoder 33 includes a decoding controller 33a, an equalizer and re-generator 33b, and a decoder 33c. In accordance with the transmission method selected in the optical transmitting device 10, the decoding controller 33a controls the operations of the equalizer and re-generator 33b and the decoder 33c. The equalizer and re-generator 33b equalizes the output signal of the optical receiving unit 32, and furthermore re-generates a symbol from the equalized signal. For example, the equalization processing may include processing for correcting a phase error. In addition, when a transmission method utilizing the polarization multiplexing is selected in the optical transmitting device 10, the equalizer and re-generator 33b re-generates two symbol sequences from two pairs of I-component signals and Q-component signals. In addition, when a transmission method in which the polarization multiplexing is not utilized is selected in the optical transmitting device 10, the equalizer and re-generator 33b re-generates one symbol sequence from one pair of an I-component signal and a Q-component signal.

In accordance with the transmission method selected in the optical transmitting device 10, the decoder 33c re-generates a transmission frame from each symbol sequence obtained by the equalizer and re-generator 33b. At this time, the number of transmission frames to be re-generated from each symbol sequence in each frame time is determined in response to the transmission method selected in the optical transmitting device 10.

In this way, in each frame time, the variable decoder 33 re-generates transmission frames having the number of which corresponds to the transmission method selected in the optical transmitting device 10. Specifically, transmission frames are re-generated the number of which is the same as the number of bits per 1 symbol of the transmission method.

Figure 12:
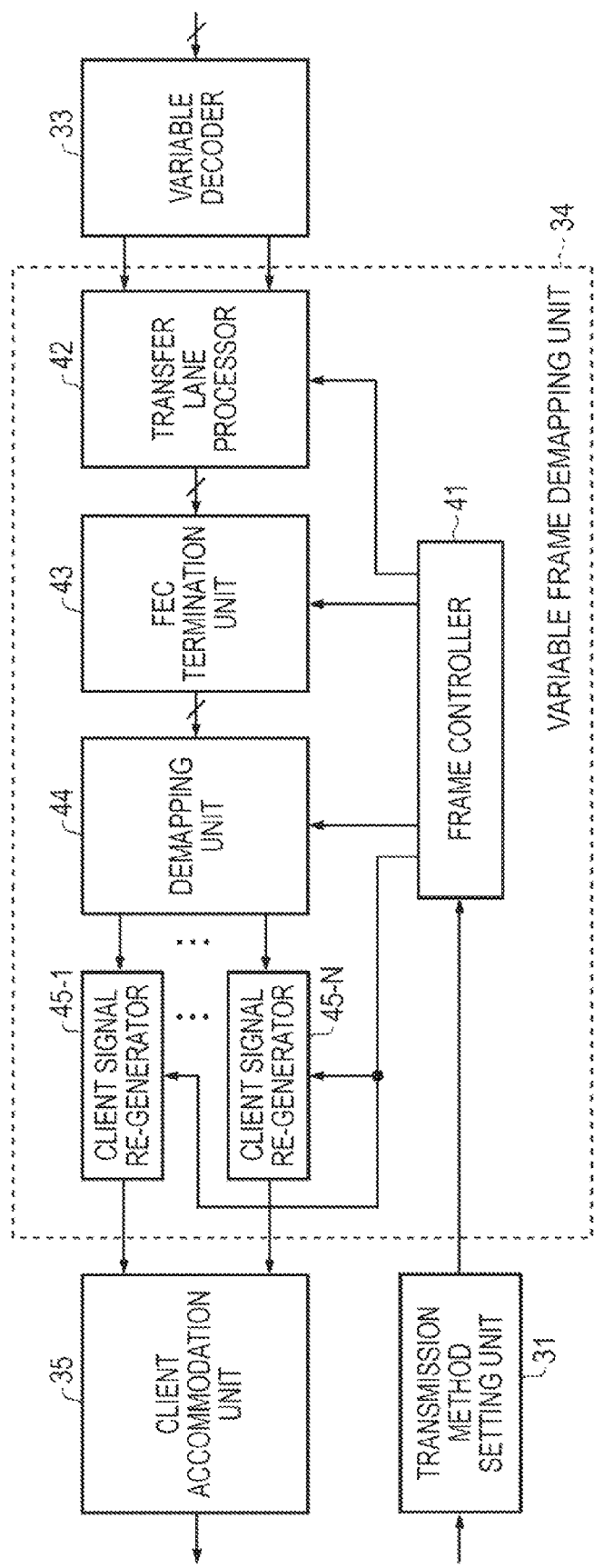
FIG. 12 is a diagram illustrating a configuration of a variable frame demapping unit.

FIG. 12 is a diagram illustrating the configuration of the variable frame demapping unit 34. The variable frame demapping unit 34 includes a frame controller 41, a transfer lane processor 42, an FEC (Forward Error Correction) termination unit 43, a demapping unit 44, and client signal re-generators 45-1 to 45-N. In addition, one transmission frame or a plurality of transmission frames, re-generated by the variable decoder 33, are input to the variable frame demapping unit 34.

In accordance with the transmission method selected in the optical transmitting device 10, the frame controller 41 controls the operations of the transfer lane processor 42, the FEC termination unit 43, the demapping unit 44, and the client signal re-generators 45-1 to 45-N. The transfer lane processor 42 discriminates a transmission lane by referring to a lane discrimination byte in each transmission frame re-generated by the variable decoder 33. Namely, a transmission frame selected by the optical transmitting device 10 is discriminated from among the transmission frames X1 to X8 and Y1 to Y8. The FEC termination unit 43 monitors the bit error of each transmission frame. If the bit error is detected, the bit error is corrected.

On the basis of the transmission method selected in the optical transmitting device 10, the demapping unit 44 performs, on each transmission frame, the inverse processing of the processing performed in the frame generator 22 in the optical transmitting device 10. In addition, the client signal re-generators 45-1 to 45-N re-generate the client signal from the output signal of the demapping unit 44. At this time, only a client signal re-generator corresponding to the transmission method selected in the optical transmitting device 10 may operate. In addition, the client accommodation unit 35 transmits to the client the client signal re-generated by the variable frame demapping unit 34.

In this way, on the basis of the transmission method information of which the optical transmitting device 10 gives notice, the optical receiving device 30 re-generates the client signal from the input modulated optical signal. At this time, when a transmission method is given notice of the transmission rate of which is slower than a maximum rate that the optical receiving device 30 can receive, the optical receiving device 30 receives the modulated optical signal in an operation mode in which power consumption is reduced. In particular, when a modulation method is given notice of that does not utilize the polarization multiplexing, some components in the optical receiving device 30 halt. Therefore, according to the configuration of the embodiment, when the transmission rate of the client signal is slow, the power consumption of the optical receiving device 30 is suppressed.

In addition, a portion of the function of the optical transmitting device 10 in the embodiment may be realized using software. In this case, the optical transmitting device 10 includes a memory that stores a program used for generating the modulation signal, and a processor used for executing the program. In the same way, a portion of the function of the optical receiving device 30 in the embodiment may be realized using software.

In addition, a portion of the function of the optical transmitting device 10 in the embodiment is realized with digital signal processing. For example, the digital signal processing may be realized with a digital signal processor (DSP) or a hardware circuit. In the same way, a portion of the function of the optical receiving device 30 in the embodiment is also realized with digital signal processing.

Second Embodiment

Figure 13:
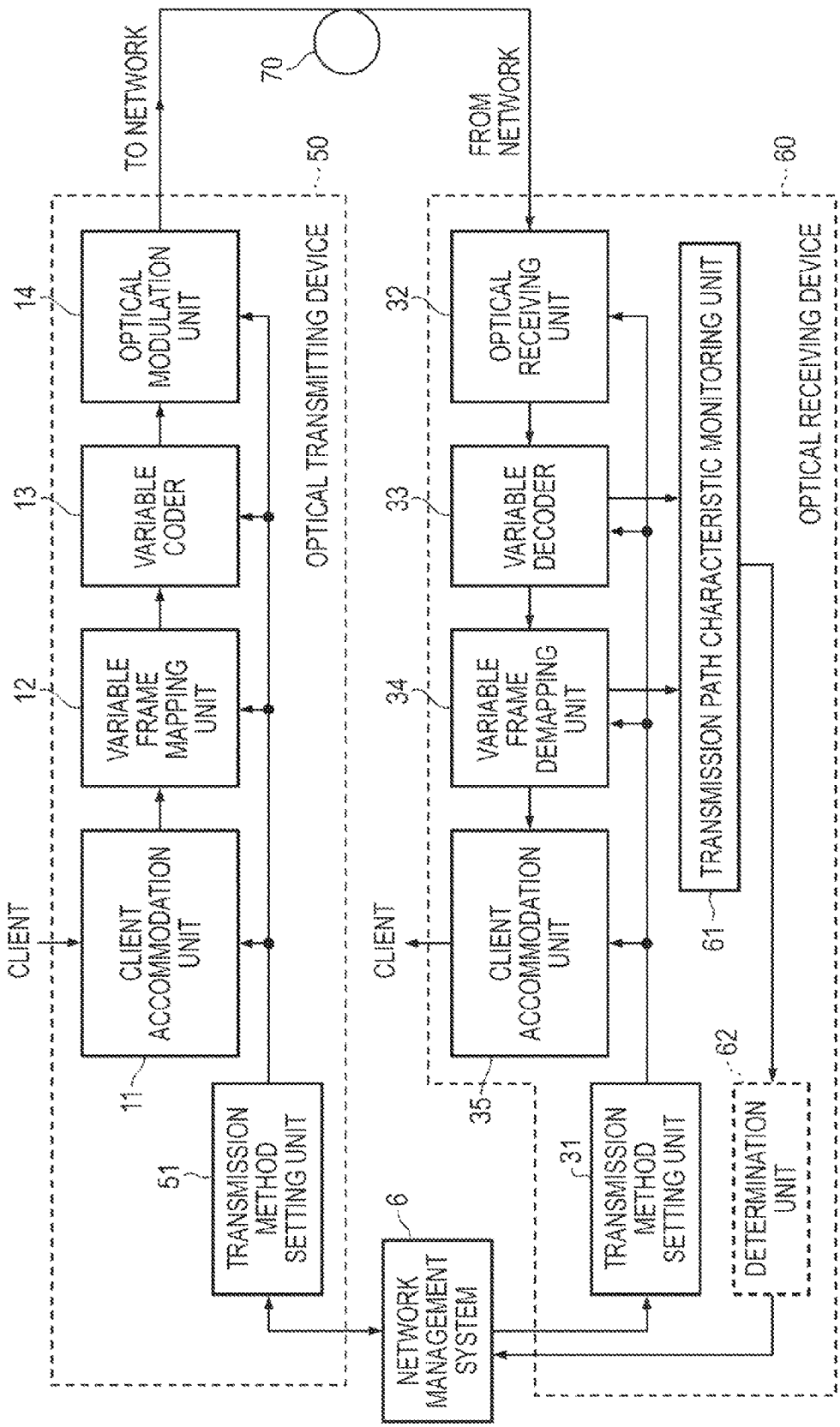
FIG. 13 is a diagram illustrating a configuration of an optical transmission system in which an optical transmitting device and an optical receiving device are used.

FIG. 13 is a diagram illustrating the configuration of an optical transmission system in which an optical transmitting device and an optical receiving device are used. In FIG. 13, an optical transmitting device 50 generates a modulated optical signal from a client signal, and transmits the modulated optical signal through an optical transmission path 70. In addition, an optical receiving device 60 generates the client signal from the modulated optical signal received through the optical transmission path 70. In addition, the optical transmitting device 50 and the optical receiving device 60 can transmit and receive a control signal through a network management system (NMS) 6.

The optical transmitting device 50 includes a client accommodation unit 11, a variable frame mapping unit 12, a variable coder 13, an optical modulation unit 14, and a transmission method setting unit 51. The configurations and operations of the client accommodation unit 11, the variable frame mapping unit 12, the variable coder 13, and the optical modulation unit 14 are basically as described with reference to FIGS. 2 to 7. In addition, the transmission method setting unit 51 selects a transmission method on the basis of the transmission rate of the client signal and the state of the optical transmission path 70 located between the optical transmitting device 50 and the optical receiving device 60. In addition, the variable frame mapping unit 12, the variable coder 13, and the optical modulation unit 14 generate the modulated optical signal from the client signal in accordance with the transmission method selected by the transmission method setting unit 51.

The optical receiving device 60 includes a transmission method setting unit 31, an optical receiving unit 32, a variable decoder 33, a variable frame demapping unit 34, a client accommodation unit 35, a transmission path characteristic monitoring unit 61, and a determination unit 62. The configurations and operations of the transmission method setting unit 31, the optical receiving unit 32, the variable decoder 33, the variable frame demapping unit 34, and the client accommodation unit 35 are basically as described with reference to FIGS. 10 to 12.

The transmission path characteristic monitoring unit 61 monitors the characteristic of the optical transmission path 70 located between the optical transmitting device 50 and the optical receiving device 60. While the characteristic of the optical transmission path 70 is not specifically limited, the characteristic of the optical transmission path 70 is expressed with the bit error rate of a re-generated data or the Q-value of a reception optical signal, for example. For example, the bit error rate is detected by an FEC termination unit 43 in the variable frame demapping unit 34. In addition, for example, the Q-value is detected by an equalizer and re-generator 33b in the variable decoder 33.

The determination unit 62 determines an available modulation method on the basis of the characteristic of the optical transmission path 70, detected by the transmission path characteristic monitoring unit 61. For example, when the characteristic of the optical transmission path 70 is very good, it is determined that all modulation methods ranging from BPSK to 256PSK are available for communication established between the optical transmitting device 50 and the optical receiving device 60. In addition, for example, when the characteristic of the optical transmission path 70 is very poor, it is determined that only BPSK and QPSK are available. In addition, the determination unit 62 notifies, through the network management system 6, the transmission method setting unit 51 in the optical transmitting device 50 of the determination result obtained on the basis of the characteristic of the optical transmission path 70.

The transmission method setting unit 51 selects a transmission method on the basis of the transmission rate of the client signal and the determination result obtained by the determination unit 62. At this time, on the basis of the determination result obtained by the determination unit 62, the transmission method setting unit 51 extracts one transmission method candidate or a plurality of transmission method candidates from among 16 transmission methods illustrated in FIG. 4. In addition, the transmission method setting unit 51 selects a transmission method corresponding to the transmission rate of the client signal, from among the transmission method candidates.

For example, it is assumed that the determination result obtained by the determination unit 62 indicates that "available modulation methods range from BPSK to 8PSK". Therefore, from among 16 transmission methods illustrated in FIG. 4, SP-BPSK, SP-QPSK, SP-8PSK, DP-BPSK, DP-QPSK, and DP-8PSK are extracted as transmission method candidates. After that, the transmission method setting unit 51 selects a transmission method corresponding to the transmission rate of the client signal, from among the 6 transmission method candidates mentioned above.

In addition, for example, it is assumed that the transmission rate of the client signal is 25 Gbit/s. In this case, in the example illustrated in FIG. 4, the SP-16PSK and the DP-QPSK correspond to the transmission rate. In addition, in order to reduce the power consumption of the optical transmitting device, the SP-16PSK is selected as described above. However, in the example illustrated in FIG. 13, a transmission method is selected in view of both the transmission rate and the characteristic of the optical transmission path 70. Accordingly, for example, when it is determined that "available modulation methods range from the BPSK to the 8PSK" and the SP-BPSK, the SP-QPSK, the SP-8PSK, the DP-BPSK, the DP-QPSK, and the DP-8PSK are extracted as transmission method candidates, the SP-16PSK is not selected. Namely, in this case, the DP-QPSK turns out to be selected as the transmission method corresponding to the client signal.

In this way, in the embodiment, the transmission method is selected in view of both the power consumption and the communication quality. Accordingly, within a range in which predetermined communication quality is satisfied, the reduction of the power consumption is realized.

Figure 14:
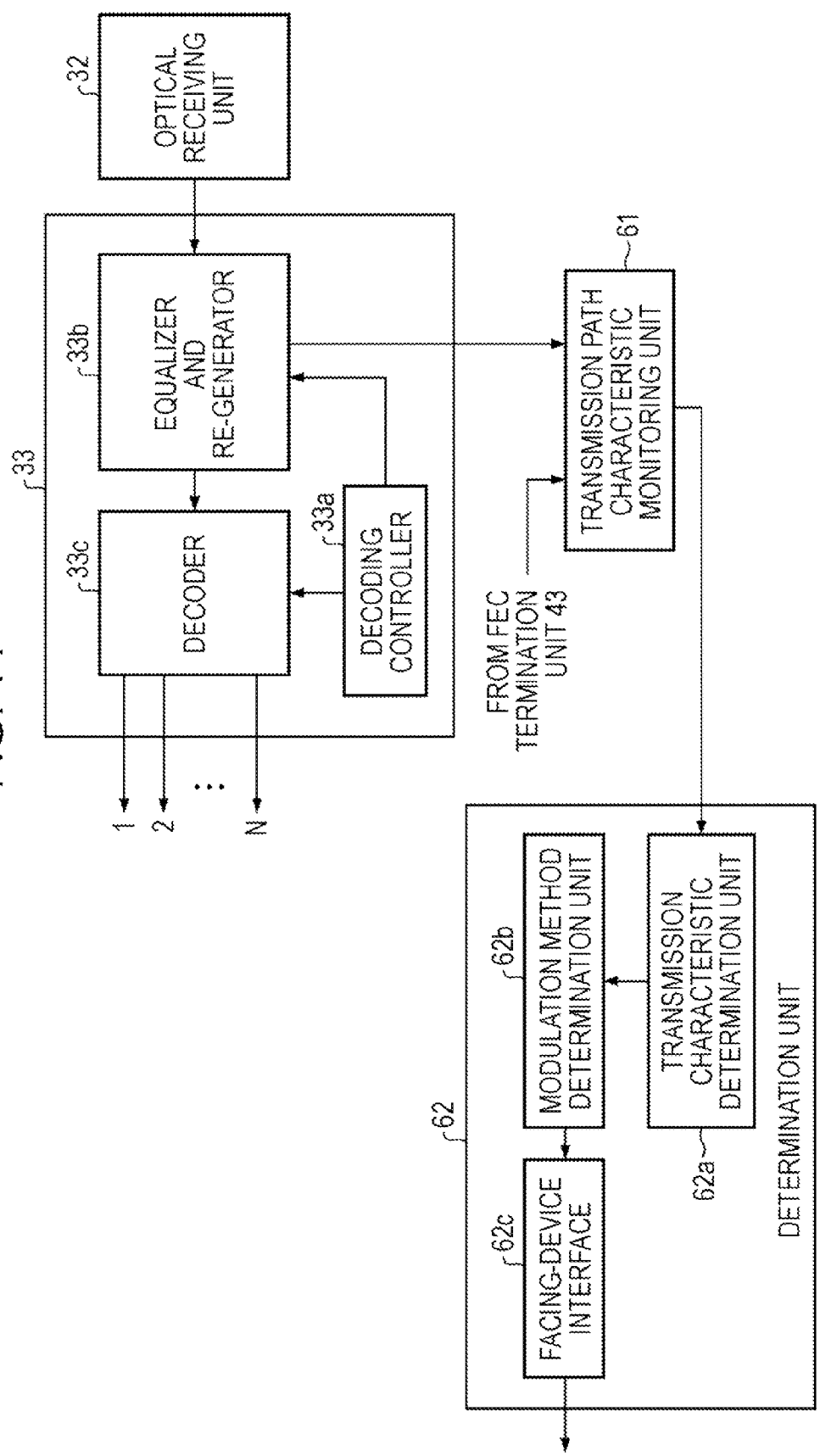
FIG. 14 is a diagram illustrating a configuration of a determination unit.

FIG. 14 is a diagram illustrating the configuration of the determination unit 62. The determination unit 62 includes a transmission characteristic determination unit 62a, a modulation method determination unit 62b, and a facing-device interface 62c. The transmission characteristic determination unit 62a determines a transmission characteristic between the optical transmitting device 50 and the optical receiving device 60 on the basis of monitoring output due to the transmission path characteristic monitoring unit 61. The modulation method determination unit 62b determines a modulation method on the basis of the transmission characteristic between the optical transmitting device 50 and the optical receiving device 60. At this time, for example, the modulation method determination unit 62b selects one available modulation method or a plurality of available modulation methods from among 8 modulation methods (BPSK to 256PSK) illustrated in FIG. 4. In addition, the facing-device interface 62c notifies the network management system 6 of the determination result due to the modulation method determination unit 62b. Subsequently, the network management system 6 transfers, to the optical transmitting device 50, the determination result due to the modulation method determination unit 62b.

FIG. 15 is a diagram illustrating the configuration of the transmission method setting unit 51. The transmission method setting unit 51 includes a facing-device interface 51a, a method selector 51b, and a method setting unit 51c. The facing-device interface 51a receives the determination result (namely, an available modulation method determined on the basis of the characteristic of the optical transmission path 70) of which the optical receiving device 60 gives notifies. In addition, the facing-device interface 51a receives the determination result through the network management system 6. In addition, in the same way as the facing-device interface 15b illustrated in FIG. 3, the facing-device interface 51a also includes a function used for notifying the optical receiving device 60 of the transmission method selected by the method selector 51b.

The method selector 51b selects a transmission method used for transmitting the client signal, on the basis of the transmission rate of the client rate, detected in the client accommodation unit 11, and the available modulation method of which the optical receiving device 60 gives notice. At this time, if a transmission method utilizing the available modulation method does not allow the client signal to be transmitted, the method selector 51b creates and sends a bandwidth reduction request to a client device management system through the client accommodation unit 11. Consequently, the client device management system lowers the transmission rate of the client signal.

For example, it is assumed that the transmission rate of the client signal is 50 Gbit/s. In addition, it is assumed that, in the optical receiving device 60, it is determined that "available modulation methods range from BPSK to QPSK". Therefore, first, the method selector 51b extracts transmission method candidates. In the example illustrated in FIG. 4, SP-BPSK, SP-QPSK, DP-BPSK, and DP-QPSK are extracted as transmission method candidates. However, the rate of any of the transmission method candidates is lower than the transmission rate, and hence it is difficult to transmit the client signal. Accordingly, in this case, the transmission method selector 51b creates a bandwidth reduction request used for lowering the transmission rate to a rate that is less than or equal to transmission rates provided by the transmission method candidates. In the example, a bandwidth reduction request used for lowering the transmission rate of the client signal to the transmission rate of the DP-QPSK (12.5 Gbit/s) is created. Accordingly, after that, a client controls the transmission rate of the client signal in accordance with the bandwidth reduction request. In addition, the method selector 51b selects the fastest transmission method from among the transmission method candidates.

In the same way as the method setting unit 15c illustrated in FIG. 3, the method setting unit 51c notifies the variable frame mapping unit 12, the variable coder 13, and the optical modulation unit 14 of the transmission method selected by the method selector 51b. Therefore, the variable frame mapping unit 12, the variable coder 13, and the optical modulation unit 14 generate a modulated optical signal from the client signal in accordance with the transmission method given notice of.

In addition, instead of determining a modulation method, the determination unit 62 in the optical receiving device 60 may determine whether or not the characteristic (namely, a bit error rate or a Q-value) of the optical transmission path 70 satisfies a predetermined quality threshold value. In this case, the determination result is notified to the optical transmitting device 50. Subsequently, the method selector 51b selects a transmission method that the number of bits per 1 symbol of which is less than that of a current transmission method. For example, it is assumed that, when the optical transmitting device 50 transmits a signal using DP-8PSK, it is determined, in the optical receiving device 60, that "the characteristic of the optical transmission path 70 is lower than the quality threshold value". In this case, the optical receiving device 60 notifies the optical transmitting device 50 of the determination result. Subsequently, the method setting unit 51b changes a modulation method from 8PSK to QPSK. Namely, the transmission method is changed from the DP-8PSK to the DP-QPSK. At this time, the client lowers the transmission rate of the client signal in response to the bandwidth reduction request created by the method selector 51b.

In addition, in the optical transmission system illustrated in FIG. 13, the optical receiving device 60 may not include the determination unit 62. Namely, the optical receiving device 60 may not determine a modulation method in accordance with the characteristic of the optical transmission path 70. In this case, the optical receiving device 60 notifies the optical transmitting device 50 of the characteristic of the optical transmission path 70 through the network management system 6. Subsequently, the method selector 51b in the optical transmitting device 50 determines an available modulation method on the basis of the characteristic of the optical transmission path 70. In addition, a transmission method is selected on the basis of the available modulation method and the transmission rate of the client signal.

FIG. 16A is a diagram illustrating an example of an optical transmitting device 100 into which the configurations of the embodiments are not introduced. The optical receiving device 100 includes a client accommodation unit 101, a mapping unit 102, a transmission frame generator 103, and an optical modulation unit 104. In addition, it is assumed that, using DP-QPSK, the optical transmitting device 100 transmits a signal having the transmission rate of 100 Gbit/s.

When the transmission rate of a client signal input to the optical transmitting device 100 is slower than the transmission rate of 100 Gbit/s, the mapping unit 102 generates a transmission signal having the transmission rate of 100 Gbit/s, by inserting or adding stuffing bytes into the client signal. In addition, using a pair of optical I/Q modulators, the optical modulation unit 104 generates an X-polarization QPSK modulated optical signal and a Y-polarization QPSK modulated optical signal. In addition, a DP-QPSK modulated optical signal is transmitted, that is generated by subjecting the output signals of the pair of optical I/Q modulators to polarization multiplexing.

In this way, the optical transmitting device 100 constantly operates using the DP-QPSK so that the signal is transmitted at a maximum transmission rate. Accordingly, when the transmission rate of the client signal is low, the number of stuffing bytes increases, and hence a large amount of a useless signal is transmitted. In addition, even if the transmission rate of the client signal is low, the power consumption of the optical transmitting device 100 is not reduced.

In contrast, as illustrated in FIG. 16B, the optical transmitting device (10 or 50) of the embodiments includes the client accommodation unit 11, the variable frame mapping unit 12, the variable coder 13, and the optical modulation unit 14. In addition, as described above, the variable frame mapping unit 12, the variable coder 13, and the optical modulation unit 14 transmit the client signal with a transmission method corresponding to the transmission rate of the client signal. Therefore, even if the transmission rate of the client signal is low, the transmission amount of a useless signal is small, and hence transmission efficiency is improved, compared with the configuration illustrated in FIG. 16A.

In addition, the optical transmitting device of the embodiments can selectively use the single polarization or the polarization multiplexing in accordance with the transmission rate of the client signal. In addition, when the transmission rate of the client signal is less than or equal to a half of the maximum transmission rate of the optical transmitting device, the optical transmitting device can use the single polarization instead of the polarization multiplexing, and transmit the client signal. In this case, the optical modulation unit 14 can halt one of the pair of optical I/Q modulators. In addition, a portion of the variable frame mapping unit 12 (for example, a portion of the client signal mapping units 21-1 to 21-N), and a portion of the variable coder 13 (for example, one of the encoders 13X and 13Y) can be halted. Accordingly, owing to the configurations of the embodiments, when the transmission rate of the client signal is low, power consumption is suppressed. In addition, in FIG. 16B, arrows indicated by dashed lines indicate a state in which no signal is transmitted.

Furthermore, many of optical transmission devices used in an optical transmission system of the related art constantly operate at maximum transmission rates regardless of the transmission rate of the client signal. Therefore, in order to prevent the lowering of the transmission efficiency with dealing with various transmission rates of the client signals, it is necessary to individually provide optical transmitting devices the transmission methods of which are different from one another, with respect to the transmission rates of the client signals. In contrast, according to the configurations of the embodiments, since transmission methods are adaptively selected in response to the transmission rate of the client signal, it is not necessary to individually provide optical transmitting devices the transmission methods of which are different from one another, with respect to the transmission rate of the client signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmitting device comprising:
a detector to detect a transmission rate of a received transmission signal;
a transmission method selector to select, from among a plurality of transmission methods, a transmission method for the received transmission signal, based on the transmission rate detected by the detector;
a modulation signal generator circuit to generate a modulation signal from the received transmission signal, based on the transmission method selected by the transmission method selector; and
an optical modulator to generate a modulated optical signal from the modulation signal generated by the modulation signal generator circuit,
wherein when the transmission rate of the received transmission signal is less than or equal to a client accommodation rate of a first transmission method, from among the plurality of transmission methods, to which a first modulation method and a single polarization are applied and when the transmission rate of the received transmission signal is less than or equal to a client accommodation rate of a second transmission method, from among the plurality of transmission methods, to which a second modulation method and a dual polarization are applied, the transmission method selector selects the first transmission method.

2. An optical transmitting device comprising:
a detector to detect a transmission rate of a received transmission signal;
a transmission method selector to select, from among a plurality of transmission methods, a transmission method for the received transmission signal, based on the transmission rate detected by the detector;
a modulation signal generator circuit to generate a modulation signal from the received transmission signal, based on the transmission method selected by the transmission method selector; and
an optical modulator to generate a modulated optical signal from the modulation signal generated by the modulation signal generator circuit, the optical modulator includes a first optical modulator and a second optical modulator,
wherein when the transmission rate of the received transmission signal is less than or equal to a client accommodation rate of a first transmission method, from among the plurality of transmission methods, to which a first modulation method and a dual polarization are applied and when the transmission rate of the received transmission signal is greater than a client accommodation rate of the remaining plurality of transmission methods, to which a single polarization are applied, the transmission method selector selects the first transmission method,
the modulation signal generator circuit generates the modulation signal corresponding to the first transmission method,
the first optical modulator and second optical modulator generate a first modulated optical signal and a second modulated optical signal, respectively, from the modulation signal, and the optical modulator polarization-multiplexes the first modulated optical signal and the second modulated optical signal.

3. The optical transmitting device according to claim 1, wherein the modulation signal generator circuit includes:
   a mapping circuit to assign received transmission signals to one or more transmission frames corresponding to the transmission method selected by the transmission method selector; and
   a coder circuit to generate modulation signals from the transmission frames to which the received transmission signals are assigned.

4. The optical transmitting device according to claim 1, wherein the transmission method selector selects the transmission method, based on the transmission rate and a state of an optical transmission path therefrom to an optical receiving device for receiving the modulated optical signal.

5. The optical transmitting device according to claim 4, wherein the transmission method selector extracts candidates for the transmission method from the plurality of transmission methods, based on the state of the optical transmission path, and selects the transmission method corresponding to the transmission rate from the candidates for the transmission method.

6. The optical transmitting device according to claim 4, wherein the transmission method selector receives, from the optical receiving device, transmission path information indicating the state of the optical transmission path.

7. An optical transmission system on which an optical signal is transmitted through an optical transmission path, the optical transmission system comprising:
   an optical transmitting device including:
      a detector to detect a transmission rate of a received transmission signal;
      a transmission method selector to select, from among a plurality of transmission methods, a transmission method for the received transmission signal, based on the transmission rate detected by the detector;
      a modulation signal generator circuit to generate a modulation signal from the received transmission signal, based on the transmission method selected by the transmission method selector; and
      an optical modulator to generate a modulated optical signal from the modulation signal generated by the modulation signal generator circuit,
      wherein when the transmission rate of the received transmission signal is less than or equal to a client accommodation rate of a first transmission method, from among the plurality of transmission methods, to which a first modulation method and a single polarization are applied and when the transmission rate of the received transmission signal is less than or equal to a client accommodation rate of a second transmission method, from among the plurality of transmission methods, to which a second modulation method and a dual polarization are applied, the transmission method selector selects the first transmission method; and
   an optical receiving device to receive, from the optical transmitting device, the modulated optical signal.

* * * * *